United States Patent [19]
Butler

[11] Patent Number: 5,241,814
[45] Date of Patent: * Sep. 7, 1993

[54] MANAGEMENT OF HEAT GENERATED BY AIRCRAFT GAS TURBINE INSTALLATIONS

[75] Inventor: Reginald J. Butler, Derby, England

[73] Assignee: Rolls-Royce plc, London, United Kingdom

[*] Notice: The portion of the term of this patent subsequent to Jun. 16, 2009 has been disclaimed.

[21] Appl. No.: 863,025

[22] Filed: Apr. 3, 1992

Related U.S. Application Data

[63] Continuation of Ser. No. 503,908, Apr. 4, 1990, Pat. No. 5,121,598.

[30] Foreign Application Priority Data

Apr. 6, 1989 [GB] United Kingdom ............... 8907788

[51] Int. Cl.⁵ .................................................. F02C 7/14
[52] U.S. Cl. ........................................ 60/39.08; 60/736
[58] Field of Search ............... 60/39.02, 39.08, 39.33, 60/39.83, 736; 184/6.11

[56] References Cited

U.S. PATENT DOCUMENTS

| | | |
|---|---|---|
| 4,151,710 | 5/1979 | Griffin et al. |
| 4,354,345 | 10/1982 | Dreisbach, Jr. et al. |
| 4,404,793 | 9/1983 | Coffinberry |
| 4,474,001 | 10/1984 | Griffin et al. |
| 4,505,124 | 3/1985 | Mayer |
| 4,696,156 | 9/1987 | Burr et al. |
| 4,705,100 | 11/1987 | Black et al. |
| 4,773,212 | 9/1988 | Griffin et al. |

FOREIGN PATENT DOCUMENTS 912762 12/1962 United Kingdom.
1426411 2/1976 United Kingdom.
2131094 6/1984 United Kingdom.

OTHER PUBLICATIONS

Brines et al., "Heat Management in Advanced Aircraft Gas Turbine Engines," The American Society of Mechanical Engineers, 86-GT-76, pp. 1-7, Jun. 8, 1986.

*Primary Examiner*—Louis J. Casaregola
*Attorney, Agent, or Firm*—Cushman, Darby & Cushman

[57] ABSTRACT

A program-controlled heat management system for an aircraft's bypass gas turbine (turbofan) engine installation, in which the engine's fuel system is put into direct heat exchange relationship with the engine's own oil system, and with an engine-driven electrical generator's oil system, by means of respective fuel/oil heat exchangers and also into selective indirect heat exchange relationship with a variable proportion of the engine's bypass air means of an engine oil/air heat exchanger. The fuel system is switchable between four different fuel flow configurations in order to vary the heat flows between the fuel system and the oil systems, two of the fuel flow configurations also involving recirculation of fuel from the engine's fuel system to a fuel tank in the aircraft wing in order to put the fuel system into selective heat exchange relationship with the tank and hence with the airstream passing over the wing. Temperatures in the oil and fuel systems are monitored and kept within predetermined limits by selecting the appropriate fuel flow configuration and selectively dumping heat to the environment through the engine oil/heat exchanger and the aircraft wing in a way which maximizes the fuel efficiency of the engine.

8 Claims, 16 Drawing Sheets

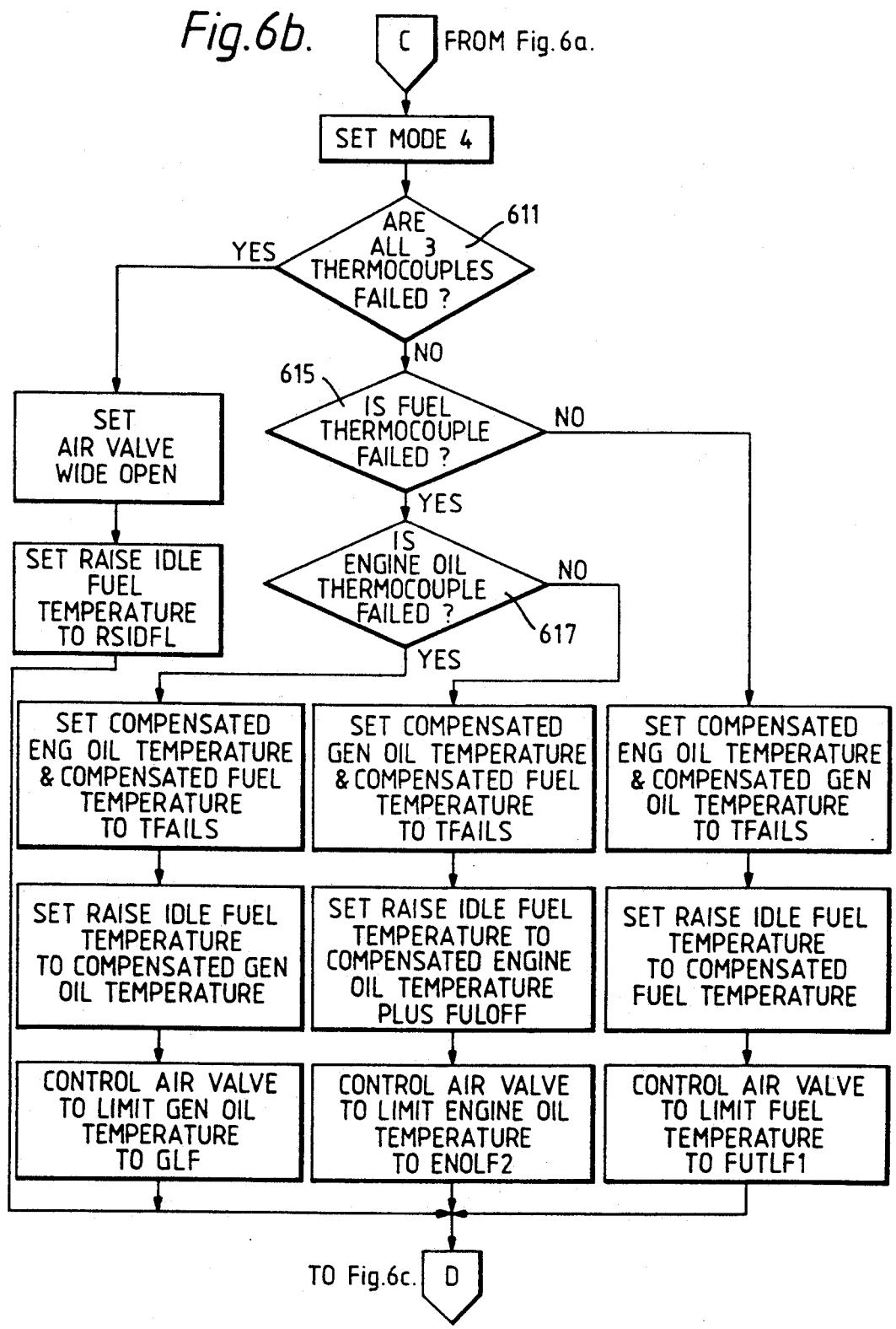

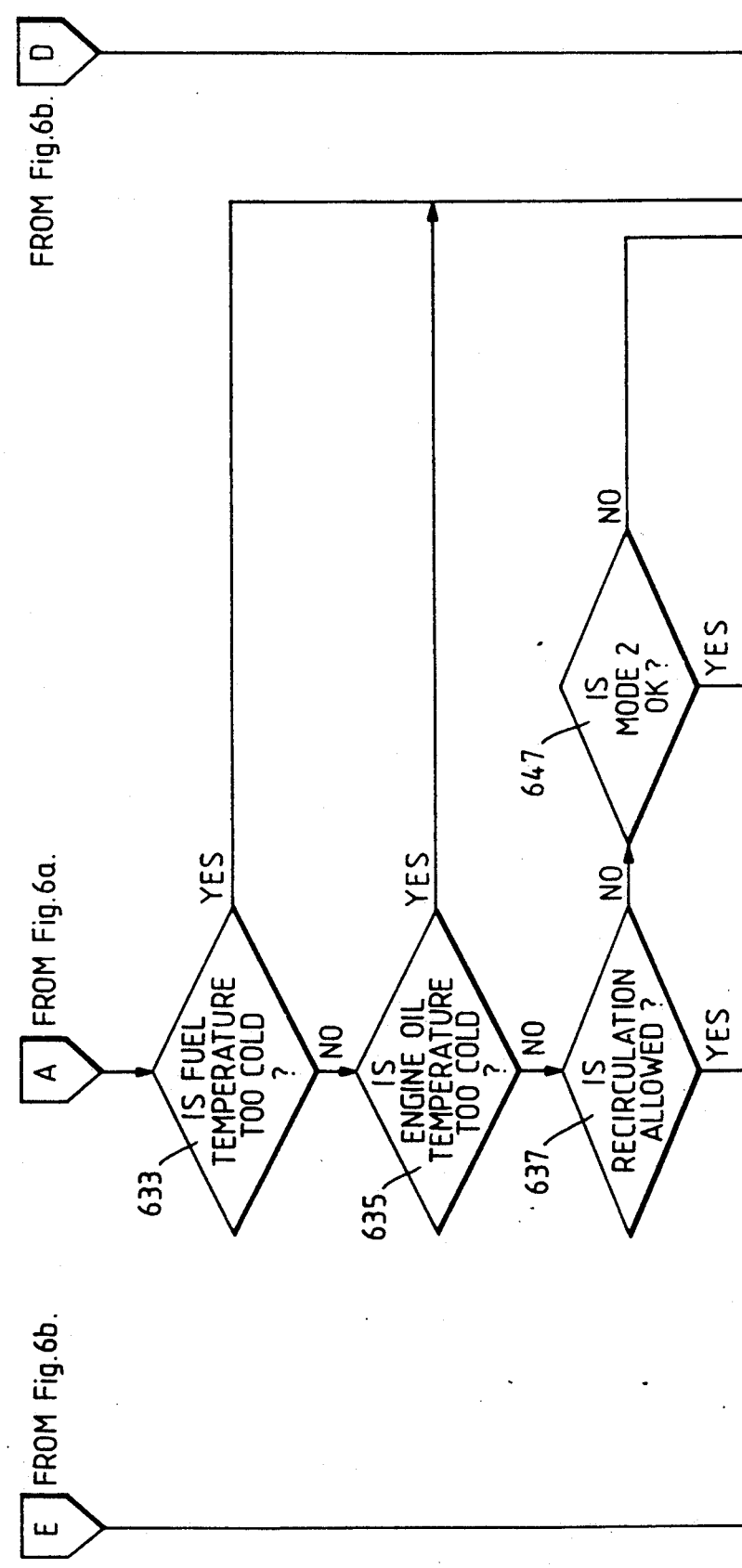

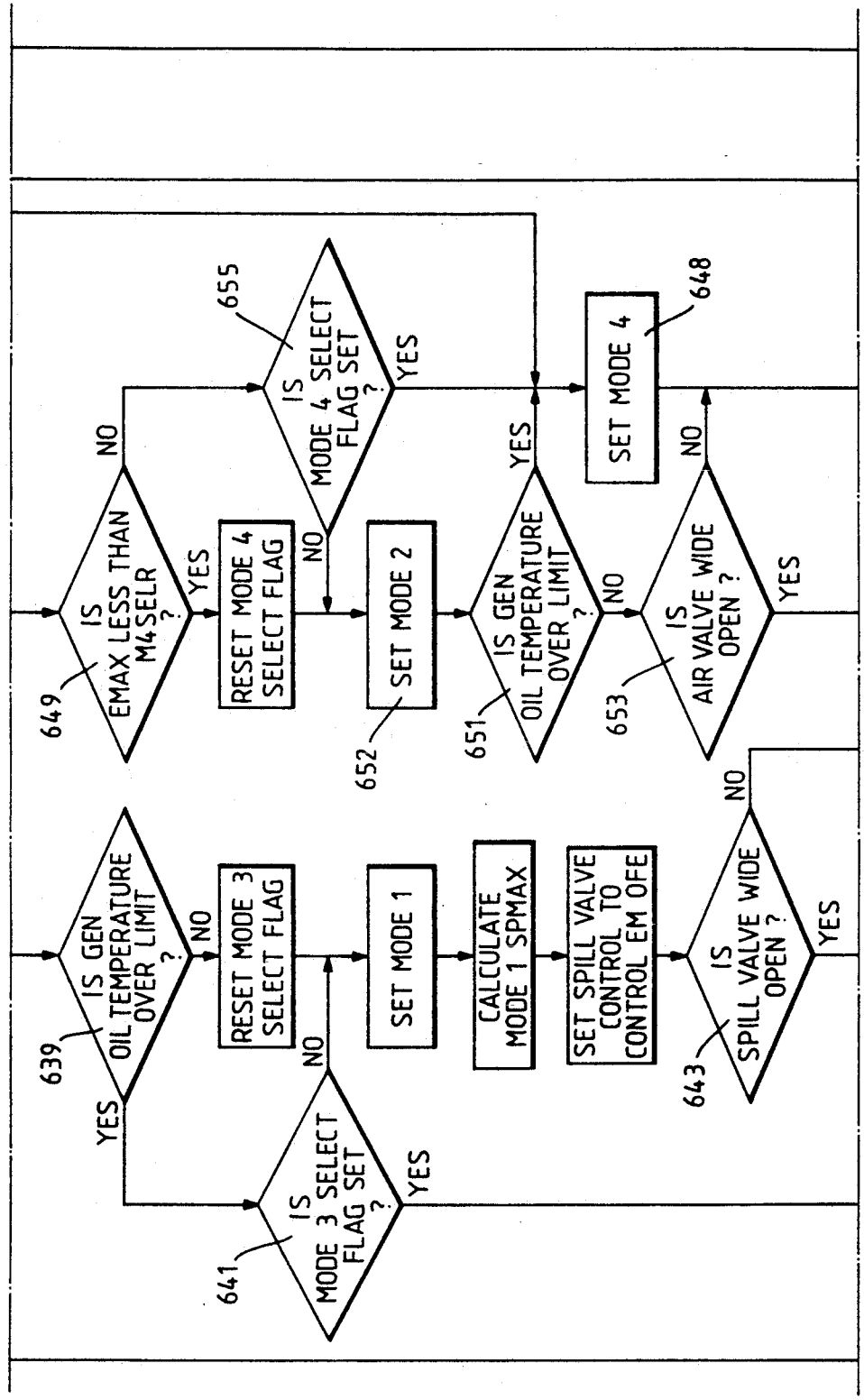
Fig.6c(cont.1)

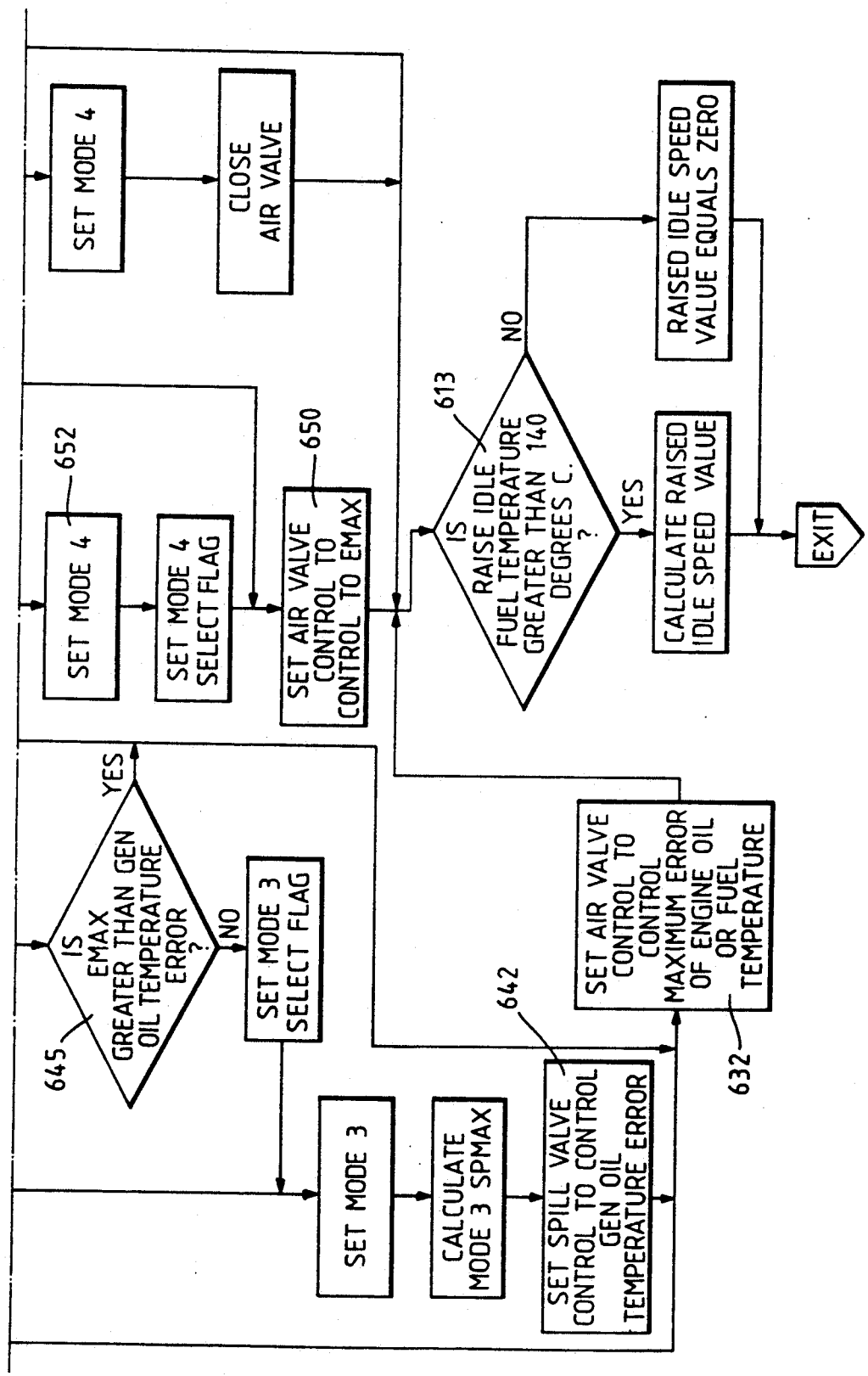
Fig.6c (cont.II)

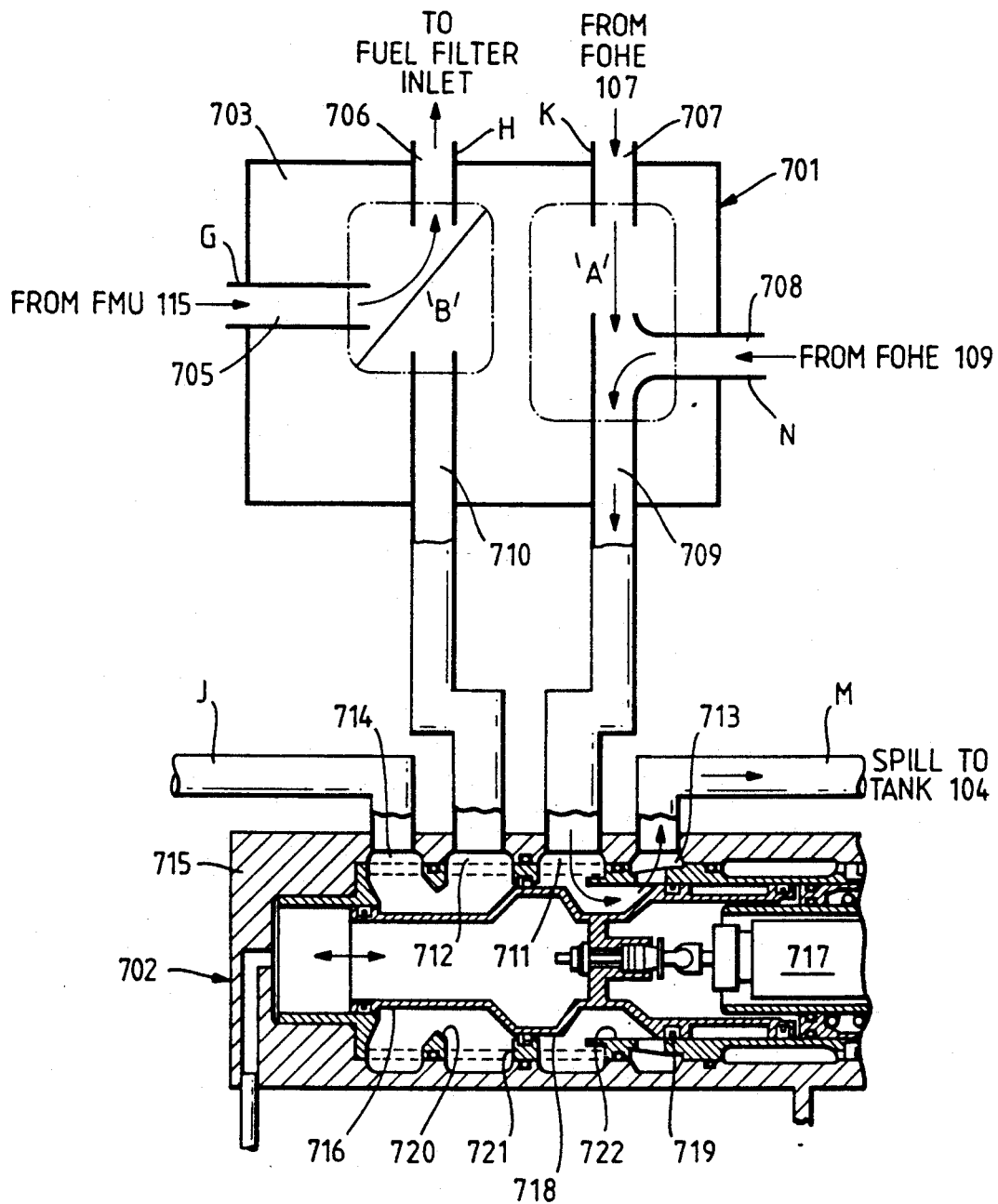
Fig. 7a. MODE 1

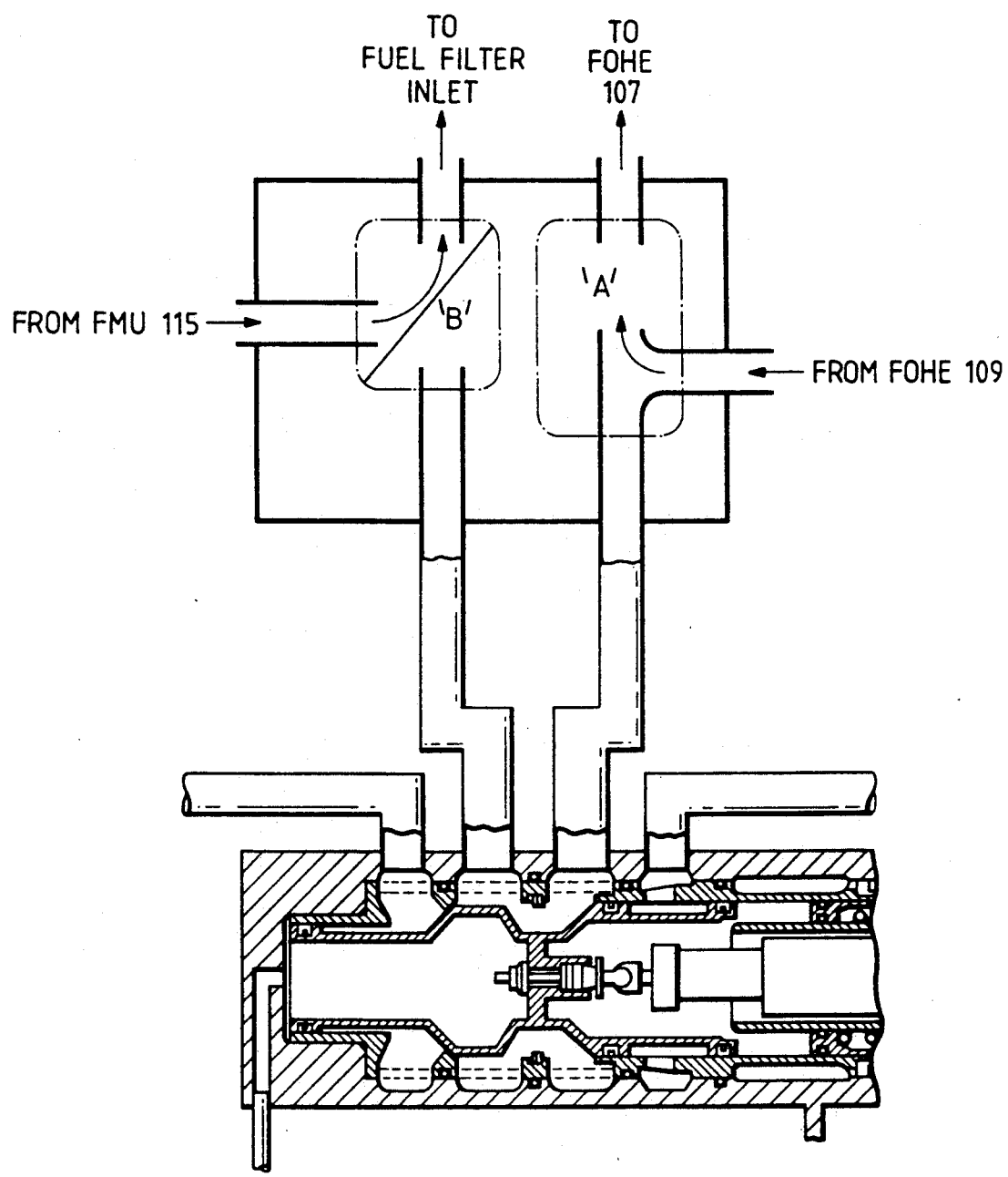

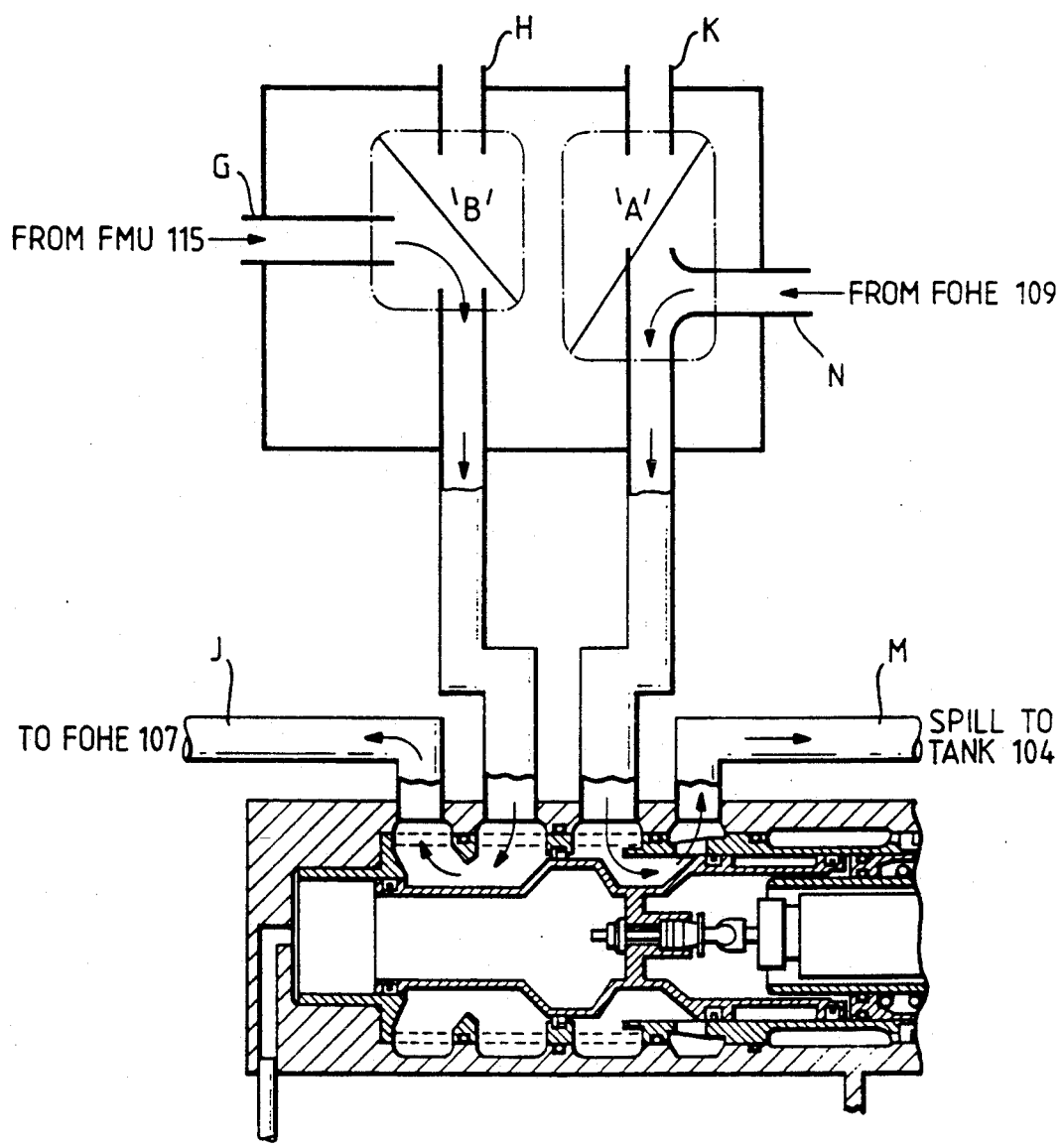
Fig. 7c. MODE 3

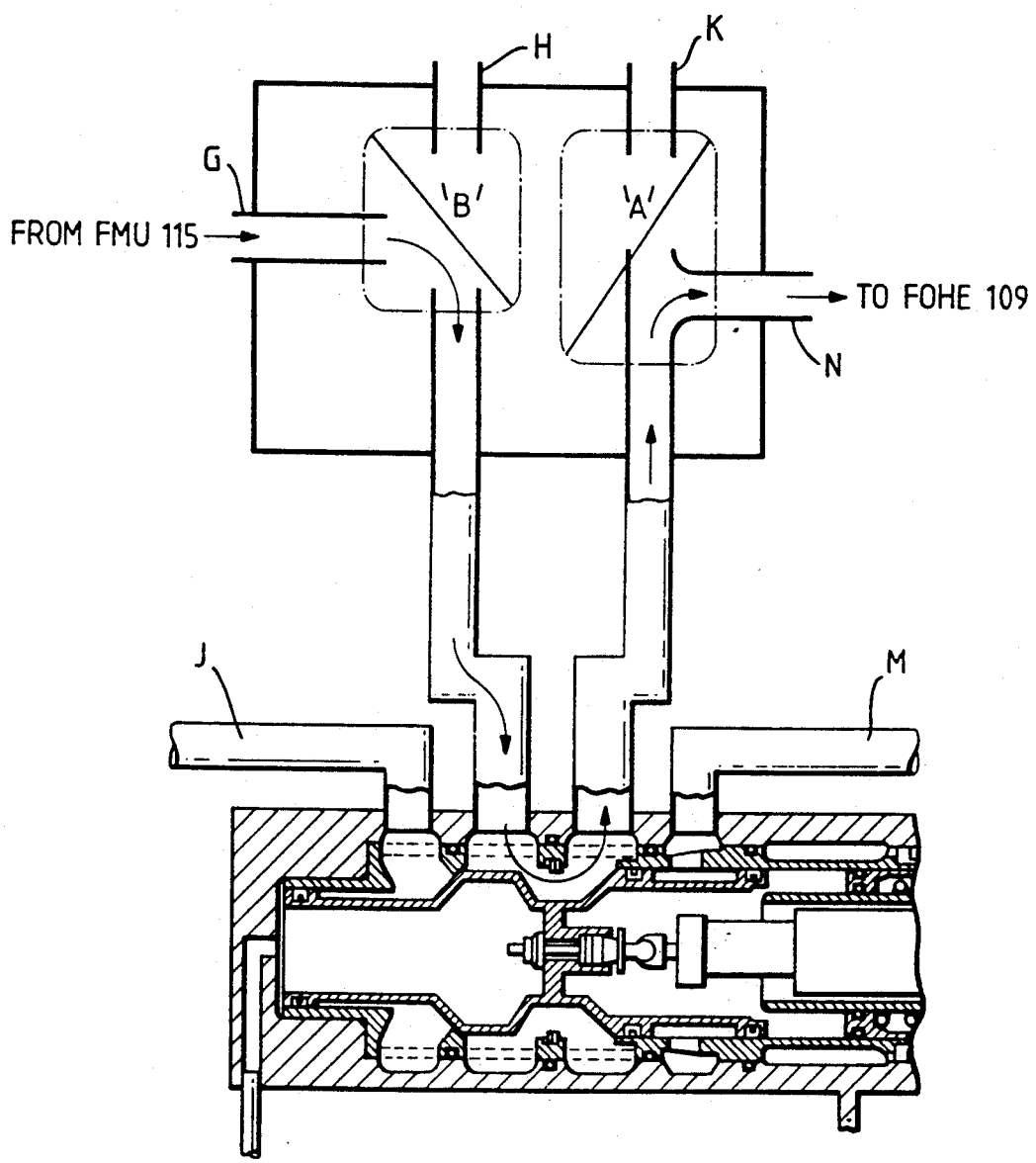
Fig. 7d. MODE 4

MANAGEMENT OF HEAT GENERATED BY AIRCRAFT GAS TURBINE INSTALLATIONS

This application is a continuation of application Ser. No. 503,908, filed Apr. 4, 1990, now U.S. Pat. No. 5,121,598.

FIELD

The present invention relates to heat management systems for aircraft gas turbine engine installations.

BACKGROUND

During operation of a gas turbine engine installed as a prime mover in an aircraft, heat is generated in various parts of the engine, its accessories and its associated fluid-flow systems. Thus, heat is obviously generated during combustion of the fuel in the engine's combustion system. Though a very high percentage of this exits the engine by way of the hot exhaust jet, or is turned into work within the engine, some heat from the combustion process is absorbed by engine components and systems. Heat is also generated by frictional effects and similarly input to engine components and systems. These frictional effects may be mechanical, such as exist between relatively moving parts of the engine or its accessories; aerodynamic, due to drag and stagnation effects in the engine's gas passages; or fluid, due to churning of oil in the lubricating oil system, fuel pumping losses, pipe flow losses, etc.

The heat input to the installation is to a large extent dissipated from it by processes of conduction, convection and radiation, but heat is also transported around the installation by the engine's fluid flow systems. These can be used in order to prevent local overheating, to raise the efficiency of heat usage, and to facilitate desirable heat exchange either internally of the installation, or by way of dumping excess heat to the environment.

It has therefore become common practice in aircraft gas turbine installations to transfer heat from the oil in the engine's lubrication oil system to the fuel in the engine's fuel system by means of a heat exchanger designated a "fuel cooled oil cooler" (FCOC) or similar. The lubricating oil of course picks up a lot of the heat generated in the engine's bearings, in the oil pumping process, and from other sources, and this is transferred to the fuel in order both to prevent the oil overheating and to improve specific fuel consumption by raising the fuel temperature prior to combustion.

Another known practice is to provide fuel and/or oil systems with air-cooled heat exchangers for dumping excess heat from these systems into the atmosphere. In turbofan engines such heat exchangers are sited within the bypass duct so that the heat can be efficiently passed to the fan air stream. However, such heat exchangers cause a loss of thrust in the fan air stream and impose a drag penalty, leading to higher fuel consumption.

Under certain operational conditions—for example, when fuel held in an aircraft's fuel tanks is too warm due to heat soaking of the aircraft or prior fuel storage at high ambient ground temperatures, or when short flight times allow inadequate time at stratospheric altitudes for the cooling effect of the cold air on the aircraft structure to keep fuel tank temperatures low—heat input from the lubricating oil to the fuel can cause the fuel temperature before combustion to become too high for safety due to the danger of vaporisation in the fuel system, e.g. excessive cavitation during pumping.

On the other hand, there are many circumstances when fuel tank temperature is low, even though temperatures in the installation's fluid flow systems are high, and in this case rejection of heat to the environment is wasteful, having an adverse effect on the engine's specific fuel consumption. Furthermore, sub-zero fuel tank temperatures can lead to icing problems under some atmospheric conditions and warming of the fuel in the tanks to above 0° C. helps to avoid such problems.

One object of the present invention is therefore to provide a convenient means of managing the heat flows in the installation's fluid flow systems in such a way that excessively high or low fuel and oil temperatures can be avoided and the heat capacity of the fuel in the fuel tanks utilised to help in this.

The problems are exacerbated by the continued advance of aircraft gas turbine technology in terms of reduction of fuel consumption by such means as increased compressor compression ratios, higher combustor exit temperatures and increased rotor speeds. Combined, these factors present considerable challenges in efficiently managing the heat generated within the relatively small volume of the engine. It is thus an object of the present invention to provide an improved capacity to manage large quantities of heat in aircraft gas turbine installations.

Besides the lubricating oil system of an engine, another closed-circuit oil system associated with large engines is that used for lubricating and cooling an electrical generator which is driven by the engine for providing electrical power to engine and aircraft systems. Unlike the engine's oil system, the generator's oil system is conventionally considered as separate from the rest of the engine installation for heat exchange purposes, and is normally provided with its own ACOC if necessary to avoid placing any additional load on the heat management capacity of the other fluid-flow systems, even though an ACOC imposes a drag penalty due to its position in an airstream flowing through or past the engine and even though under many engine operational conditions an additional heat input to the fuel would benefit efficiency. Consequently, it is a desirable object of the present invention to facilitate efficient integration of such generator oil systems with other fluid-flow systems of the engine installation in terms of their heat-exchange relationships, thereby providing the installation with a more comprehensive heat management capability and avoiding the need to give the generator's oil system its own ACOC.

SUMMARY OF THE INVENTION

Expressed broadly, the present invention provides a method for managing the heat generated in an aircraft's gas turbine engine installation, comprising putting the engine's fuel system in heat exchange relationship with a plurality of closed circuit fluid-flow systems of the engine, at least the fuel system having a plurality of fluid flow paths therein;

selectively dumping heat from the installation to the environment;

selectively varying the route of the fuel through the fluid flow paths in order to achieve a plurality of alternative fuel flow configurations, changes in fuel flow configuration causing changes in the heat exchange relationship of the fuel system with the closed circuit fluid-flow systems;

monitoring temperatures in at least the fuel system and the closed circuit fluid-flow systems; and comparing the monitored temperatures with predetermined limit values thereof;

the selection of fuel flow configurations being controlled in concert with the dumping of heat to the environment so as to avoid variation of the monitored temperatures beyond the predetermined limit values while minimising the amount of heat so dumped.

The invention also provides a heat management system capable of putting the above method into effect, comprising:

means for putting the engine's fuel system in heat exchange relationship with a plurality of closed circuit fluid-flow systems of the engine, at least the fuel system having a plurality of fluid flow paths therein;

heat dumping means operable to dump excess heat from the heat management system to the environment;

fuel valve means operable to vary the route of the fuel through the fuel flow paths in order to achieve a plurality of alternative fuel flow configurations, the arrangement being such that changes in fuel flow configuration cause changes in the heat exchange relationship of the fuel system with the closed circuit fluid-flow systems;

temperature monitoring means for monitoring temperatures in at least the fuel system and the closed circuit fluid-flow systems; and control means for comparing the monitored temperatures with predetermined limit values thereof and controlling operation of the fuel valve means and the heat dumping means thereby to avoid variation of the monitored temperatures beyond the predetermined limit values while at the same time minimising the amount of heat dumped to the environment.

Alternatively expressed, the invention is a method of managing the heat generated in an aircraft's gas turbine aeroengine installation, in which a fuel system of the engine is put into direct heat exchange relationship with an oil circulatory system of the engine and also selectively into indirect heat exchange relationship through the engine's oil circulatory system with an air system of the engine, the fuel system being switchable between a plurality of different fuel flow configurations in order to vary the heat flows between the fuel system and the engine oil circulatory system, at least one of the fuel flow configurations also involving return of fuel from the engine's fuel system to a fuel tank in the aircraft in order to put the fuel system into heat exchange relationship with the tank, temperatures in the oil and fuel systems being monitored and kept within predetermined limits by selecting an appropriate fuel flow configuration and selectively dumping heat to the air system through the engine's oil circulatory system and to the aircraft fuel tank thereby to maximise the fuel efficiency of the engine.

We prefer that the engine's fuel system also exchanges heat with a further oil circulatory system comprising an oil system for an electrical generator driven by the engine.

The aeroengine may be a turbofan with a bypass duct and the engine's air system may comprise a bypass air bleed system taking air from the bypass duct, the engine's oil circulatory system thereby transferring heat to the bypass air.

We prefer to vary the amount of air flowing through the air system so that the amount of heat exchange between the oil system and the air system is varied, say between zero and its maximum capacity.

In the disclosed embodiment where are four different fuel flow configurations, of which two involve return of fuel from the engine's fuel system to the fuel tank, the amount of fuel being returned to the tank from the fuel system being variable from zero to a maximum.

Conveniently, the different fuel flow configurations are achieved by changing the direction of fuel flow around the fuel system. This may be by means of connecting up a plurality of different fuel flow paths in differing orders.

In detail, the disclosed heat management system comprises:

(i) a fuel system including fuel tank means in the aircraft, pump means for pumping fuel from the fuel tank means through the rest of the fuel system, combustor means for burning the fuel in the engine, and fuel metering means for metering the amount of fuel supplied to the combustor means; (ii) an engine oil system for supplying oil to lubricate the engine and to remove heat therefrom; (iii) a generator oil system for supplying oil to lubricate an electrical generator and to remove heat therefrom, the electrical generator being driven by the engine; (iv) first heat exchange means for transferring heat between the engine fuel system and the engine oil system; (v) second heat exchange means for transferring heat from the engine oil system to an engine-derived forced airstream; and (vi) third heat exchange means for transferring heat between the generator oil system and a heat transport fluid; wherein:

(a) the second heat exchange means is associated with first valve means operable to vary the heat flow from the engine oil system to the forced airstream;

(b) the third heat exchange means is arranged to transfer heat between the generator oil system and the fuel system, the heat transport fluid being fuel;

(c) the fuel system further includes a plurality of fuel flow paths for connecting the pump means, the fuel metering means, the first and third heat exchange means and the fuel tank means in a plurality of different predetermined fuel-flow configurations with respect to the flow of fuel around the fuel system, at least one of the fuel flow paths being for returning fuel to the fuel tank means from the rest of the fuel system, and second valve means operable to vary the route of the fuel through said fuel flow paths to achieve said predetermined fuel flow configurations, the arrangement being such that changes in fuel flow configuration cause changes in the heat flows within the heat management system, including changes in the heat flows in the first and third heat exchange means and in the amount of heat put into the fuel tank means through fuel returned thereto;

(d) temperature monitoring means are provided for monitoring temperatures in the fuel system, the engine oil system and the generator oil system, the monitored temperatures in the fuel system including at least the temperatures of the fuel in the tank and of the fuel at a point in the fuel system before the fuel metering means; and (e) control means are provided for comparing the monitored temperatures with predetermined limit values thereof and controlling operation of the first and second valve means thereby to substantially avoid variations of the monitored temperatures beyond the predetermined limit values while at the same time minimising the specific fuel consumption of the engine.

BRIEF DESCRIPTION OF THE DRAWINGS

An embodiment of the invention will now be described by way of example only and with reference to the accompanying drawings, in which:

FIGS. 6a to 6c are a logic flow diagram showing how the four operational modes are executed under program control; and FIGS. 7a to 7d show in diagrammatic form a practical arrangement for a fuel valve unit capable of changing the heat management system between the four fuel flow configurations.

DETAILED DESCRIPTION OF THE DRAWINGS

Figure 1:
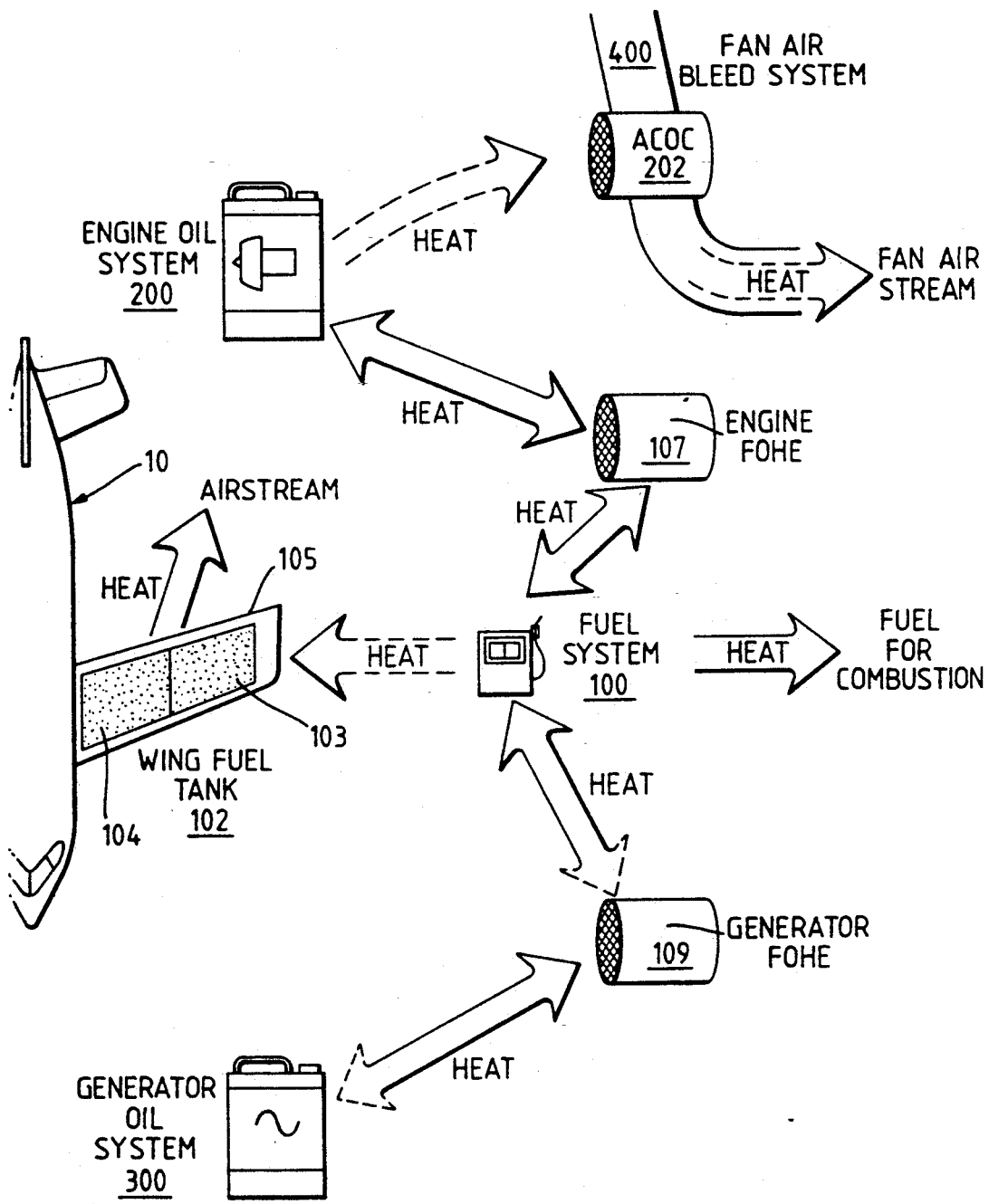
FIG. 1 is a schematic diagram illustrating the heat exchange relationships between the main parts of a heat management system in accordance with the present invention.

The architecture of the specific embodiment of the invention now to be described is more complicated than that of most previously proposed heat management systems, with the possibility of switching between any of four different available operating modes and variation within those modes. To aid understanding, FIG. 1 gives an initial overview, in schematic pictorial form, of the possible major heat flows in the system, ignoring component details, such as valves, fluid lines and controls, necessary to alter those heat flows. The heat flows are shown by large arrows: arrows shown by dashed lines represent heat flows which are not present in all operating modes.

The heat management system is for a turbofan aeroengine mounted on an aircraft 10, and basically comprises four major fluid-flow systems, namely:
- the engine's fuel system 100
- the engine's oil system 200
- the aircraft electrical power generator's oil system 300 (this generator being driven as an accessory of the engine).
- the engine's fan air bleed system 400.

Note that a large aircraft such as illustrated will have two or more engines. Hence, a heat management system will be necessary in respect of each engine.

When the engine is running, heat is generated in various ways.

The major sources of heat which the heat management system must cope with are
- fuel pumps which put heat into the engine's fuel system 100
- oil lubricated bearings and gearboxes which put heat into the engine's oil system 200
- the electrical generator, which puts heat into the generator's oil system 300
- the combustion process, which puts heat into the entire installation.

Ultimately heat is lost from all parts of the installation directly or indirectly to the environment, but it is the heat management system's task to put the engine's fuel system in a variable heat exchange relationship with the engine's oil system 200 and the generator's oil system 300, and to selectively dump heat to the environment, in ways which avoid variation of oil and fuel temperatures beyond certain limits but which also minimise the amount of heat so dumped. The heat management system therefore provides major heat transfer paths between the heat sources and the environment and varies or adjusts the paths in a way which achieves this task.

In particular, the heat management system's relationship with the environment is seen in terms of transfer of heat to the environment via three major heat sinks, viz:
- the airstream flowing over the aircraft's wings during flight, to which heat is lost from the fuel system 100 through the fuel tank 102 in the wing 105 of the aircraft 10;
- a portion of the fan air stream flowing through the fan air bleed system 400 of the engine, to which hear is lost from the engine's oil system 200; and
- the fuel flow to the combustor of the engine, which transports heat directly out of the fuel system 100.

Transport of heat around the heat management system is facilitated by the engine's fuel/oil heat exchanger (FOHE) 107, which transfers heat between the engine's oil system 200 and the engine's fuel system 100, and by the generator's FOHE 109, which transfers heat between the generator's oil system 300 and the engine's fuel system 100.

In order to make effective use of both the heat capacity of the fuel stored in the wing fuel tanks 102 and of the heat dumping capacity of the aircraft wing 105 to the airstream flowing over them, dumping of heat from the rest of the engine's fuel system 100 to the wing tank 102 and the airstream is by means of recirculation of fuel back to the tank 102 after it has already been pumped out of the tank and put into heat exchange relationship with the engine oil system 200 and the generator oil system 300. However, such recirculation is selected only at the option of program control, as explained later.

Dumping of heat to the fan air stream is through the engine's oil system 200 by utilising the fan air bleed system 400 to force circulation of an air through the so-called air-cooled oil cooler (ACOC) 202. Such circulation is only selected at the option of program control.

The above two heat dumping options introduce a desirable flexibility into the operation of the heat management system, necessary for utilising it in the most efficient way.

Figure 2:
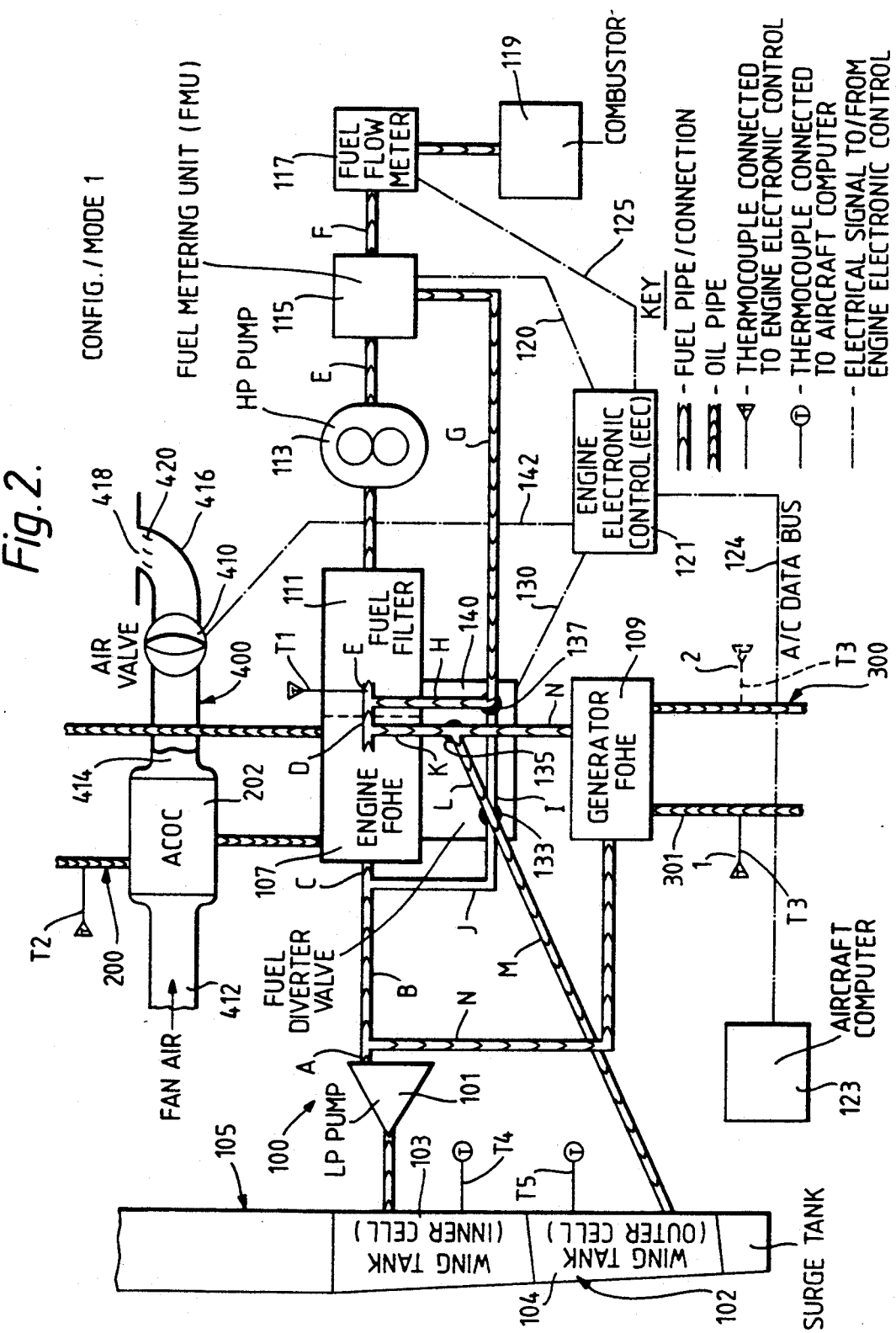
FIG. 2 is a schematic representation of a heat management system in accordance with the present invention, the system being shown in a first fuel flow configuration and operating in a first operational mode.

Referring now to FIG. 2, the constituent parts of the heat management system will now be described in more detail. It should be noted that in FIG. 2 and in the further FIGS. 3 to 5, fuel flows in the fuel system 100 are indicated by widely spaced chevrons, oil flows in the engine oil system 200 and the generator oil system 300 are indicated by closely spaced chevrons, and fan air flows in the fan air bleed system 400 are indicated by arrows.

FUEL SYSTEM

The fuel system 100 has four alternative fuel flow configurations as shown in FIGS. 2 to 5. In all of them a low pressure fuel pump 101 draws fuel from the inboard cell 103 of the fuel tank 102 in the aircraft wing 105 and passes at least a portion of it to the engine FOHE 107 through path A,B and C of the fuel system. The FOHE 107 puts the fuel system 100 and the engine oil system 200 in heat exchange relationship with each other. At least a portion of the fuel output of the FOHE 107 is passed along paths D and E through a fuel filter 111 and thence directly to a high pressure fuel pump 113, whose high pressure output goes to a fuel metering unit (FMU) 115. At least part of the input to the FMU 115 is passed from its output along path F to a fuel flow meter 117 and the combustor 119. FMU 115 meters the fuel supplied to the combustor 119 in accordance with fuel control signals 120 from the engine electronic control (EEC) 121. Any fuel supplied by pump 113 which is surplus to the engine's combustion requirements as determined by EEC 121 and FMU 115 is recirculated back to an earlier part of the fuel system through a pump spill return loop incorporating path G. However, the rest of the pump spill return loop has paths which vary according to the current fuel flow configuration as explained later.

In two of the fuel flow configurations (FIGS. 2 and 4), some of the fuel which has been pumped by the low pressure pump 101 is passed back to the outboard cell 104 of fuel tank 102. This is used as a way of dumping heat from the main part of the fuel system to the fuel tank 102 and thence to the atmosphere, and will be more fully explained later.

The fuel control signals 120 from the EEC 121 are applied to a motorised valve (not shown) within the fuel metering unit 115, so as to schedule the fuel flow to the engine in accordance with control laws built into the EEC 121 concerning the fuel flow which the engine requires in order to deliver the thrust currently being demanded by the pilot. A signal representing the thrust demanded is passed to EEC 121 from the aircraft computer 123 via a data bus 124, but in producing the fuel control signals 120 the EEC 121 also takes into account input signals (not shown) from various sensors which monitor conditions in the engine such as temperatures and pressures. Obviously one other important input signal is the fuel flow signal 125 from the fuel flow meter 117 which enables the EEC 121 to monitor actual fuel flow to the engine.

The EEC 121 may also control other subsystems of the engine in response to various sensor and control inputs—for instance, it may schedule the positions of variable guide vanes or bleed valves in the compressor. However, an aspect of the present invention is to utilise the EEC 121 in order to control the heat exchange relationships between the fuel system 100, the oil systems 200 and 300, and the environment. It does this by monitoring temperature signals from thermocouples T1 to T5 situated as shown at various points in the fuel system, the engine oil system and the generator oil system, comparing the temperatures with allowed limits in those systems, and outputting control signals 130 and 142 to control respectively a motorised fuel diverter valve unit 140 in the fuel system 100 and a motorised air modulating flap valve unit 410 in the fan air bleed system 400.

For convenience of illustration in FIGS. 2 to 5, the diverter valve unit 140 is shown as comprising three different valves 133,135 and 137, but a more practical arrangement will be described in relation to FIG. 7.

Through fuel diverter valve unit 140, the EEC 121 selectively varies the route which some of the fuel pumped by the low and high pressure pumps 101 and 113 takes through a number of fluid flow paths G to N provided in the fuel system. Thus, the EEC 121 operates valve unit 140 to achieve the four alternative fuel flow configurations illustrated in FIGS. 2 to 5 respectively, each of which facilitates a different heat exchange relationship between the fuel system 100, the engine and generator oil systems 200 and 300, and the environment, as will be explained later.

It may be mentioned at this point, however, that operation of the fuel diverter valve unit 140 under control of the EEC 121 varies the routes which the fuel takes around the fuel system in the following major respects.

(a) Pump Spill Return Loop. This is changed between routes defined by paths G,H in FIGS. 2 and 3, paths G,I,J in FIG. 4 and paths G,I,L,N in FIG. 5. Route G,H puts the spill fuel back into the main fuel flow line just before the fuel filter 111, route G,I,J puts it back just before FOHE 107 and route G,I,L,N puts it back just after the low pressure pump 101 by means of reverse flow through path N, which includes the generator's FOHE 109.

(b) Generator FOHE 109 Supply Loop. This is changed between routes defined by paths N,L,M in FIGS. 2 and 4, paths N,K, in FIG. 3 and paths G,I,L,N in FIG. 5. Route N,L,M takes fuel from the output of the low pressure pump 101 and returns it to the outboard cell 104 of the fuel tank in the aircraft wing 105. Route N,K also takes fuel from pump 101, but puts it back into the main fuel line just after the engine's FOHE 107. Route G,I,L,N incorporates the FOHE 109 in the pump spill return loop as mentioned in (a) above.

(c) "Back-to-Tank" Fuel Return Loop. Starting from the low pressure pump 101, this is changed between routes defined by paths A,B,C,K,L,M and A,N,L,M in FIG. 2, and paths A,N,L,M only in FIG. 4. There is no fuel tank return loop in FIGS. 3 and 5. Route A,B,C,K,L,M takes fuel out of the main fuel flow line just after the engine's FOHE 107 and passes it straight back to the outer wing tank 104. Route A,N,L,M comprises the generator's FOHE 109 supply loop as mentioned in (b) above.

ENGINE OIL SYSTEM AND FAN AIR BLEED SYSTEM

Through flap or butterfly valve unit 410, the EEC 121 selectively varies the amount of fan bleed air allowed to pass through the fan air bleed system 400. The latter comprises an intake duct 412 leading to the ACOC 202, an intermediate duct 414, for passing air from the ACOC 202 to the flap valve unit 410, and an outlet duct 416, which conveys the fan bleed air to an exit nozzle 418 in the exterior surface of the engine's nacelle, where it joins the slipstream after being turned in the appropriate direction by turning vanes 420.

Figure 4:
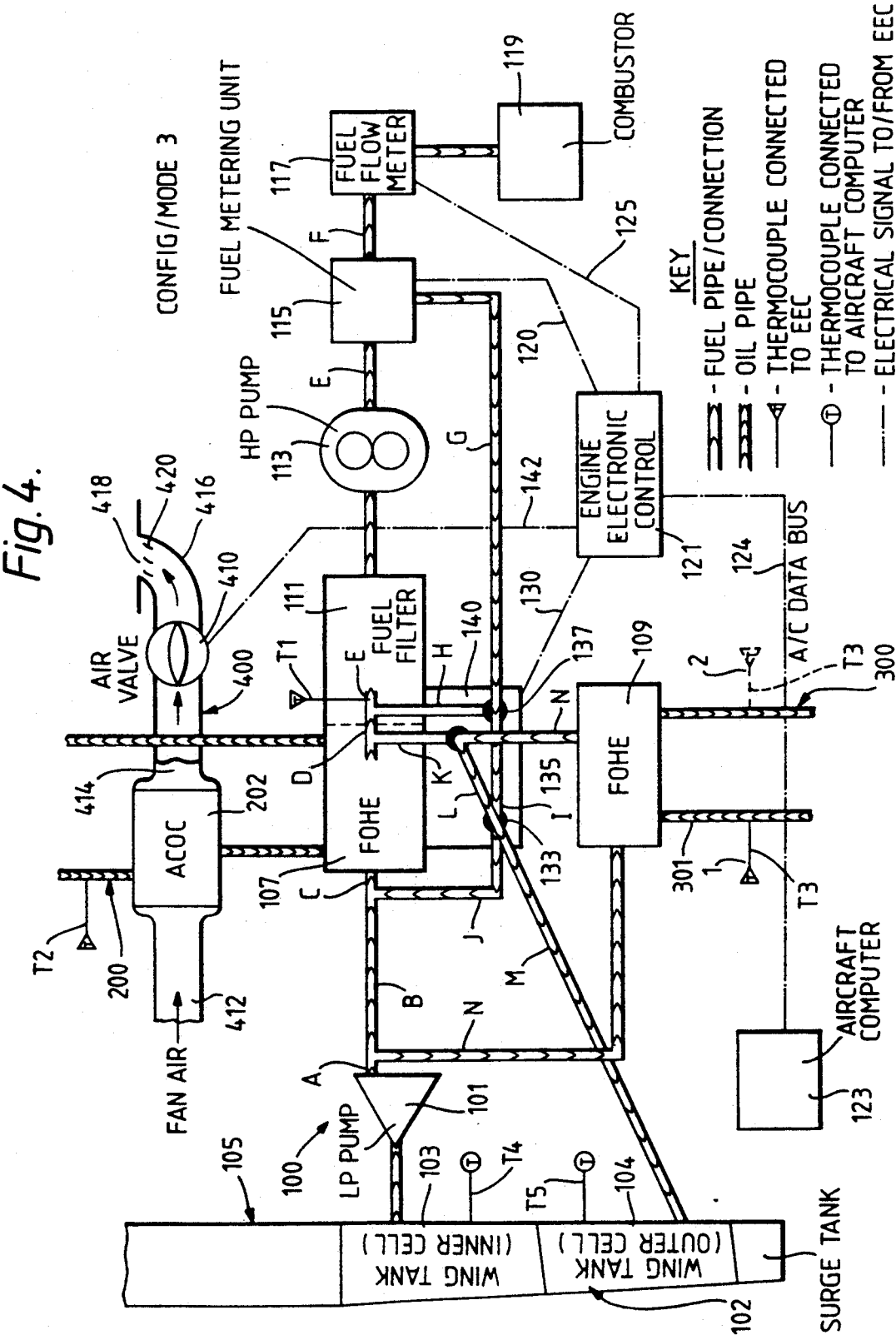

Under the control of the EEC 121, the flap valve unit 410 can vary the rate of heat dumping from the engine oil system 200 to the environment (via the fan air stream) from a very low value, when the valve is closed as shown in FIG. 2 and essentially no fan bleed air is passing through the ACOC 202, to a high value, when the valve is fully open as shown in FIG. 4 and a maximum mass flow rate of fan bleed air is passing through the ACOC. The actual valve position is selected by the EEC 121 in order to give the minimum airflow required to maintain fuel system and engine oil system temperatures within their limits, as measured by thermocouples T1 and T2 respectively which are connected directly to the EEC 121. The airflow through the fan air bleed system 400 is minimised because of its adverse impact on the engine's specific fuel consumption, due to usage of fan air which would otherwise be contributing to the thrust of the engine and also due to aerodynamic drag in the ACOC 202 and associated ducting 412,414,416.

An LVDT can be utilised to give positional feedback for the air valve 410.

GENERATOR OIL SYSTEM

Besides the heat exchange loop 301 from the generator itself (not shown) through the generator FOHE 109, the generator oil system 300 also includes a charge pump (not shown) to keep the oil circulating and a scavenge filter (not shown) to prevent circulation of damaging particles with the oil. A thermocouple T3, connected directly to the EEC 121, is situated in the loop 301 just before the FOHE 109 to monitor the generator oil temperature. Alternatively, as shown by dashed lines, it could be situated just after the FOHE 109.

SYSTEM LOGIC

Before describing in detail the differing operational modes of the heat management system with reference to FIGS. 2 to 5, a review of the system's program control logic incorporated in EEC 121 will be given with reference to FIGS. 6a to 6c.

DETAILED DESCRIPTION OF CONTROL LOGIC

Figure 6A:
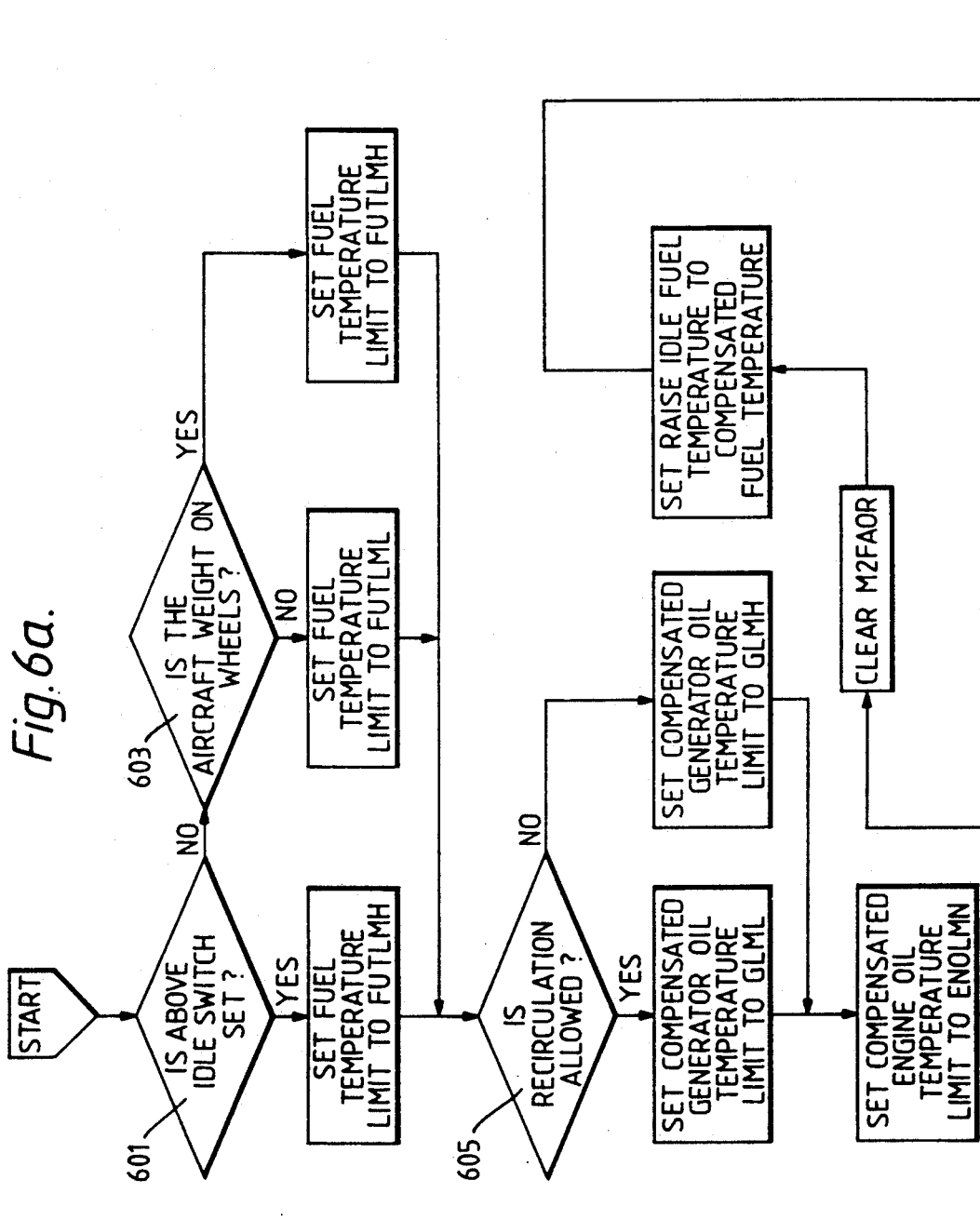
Figure 6A:
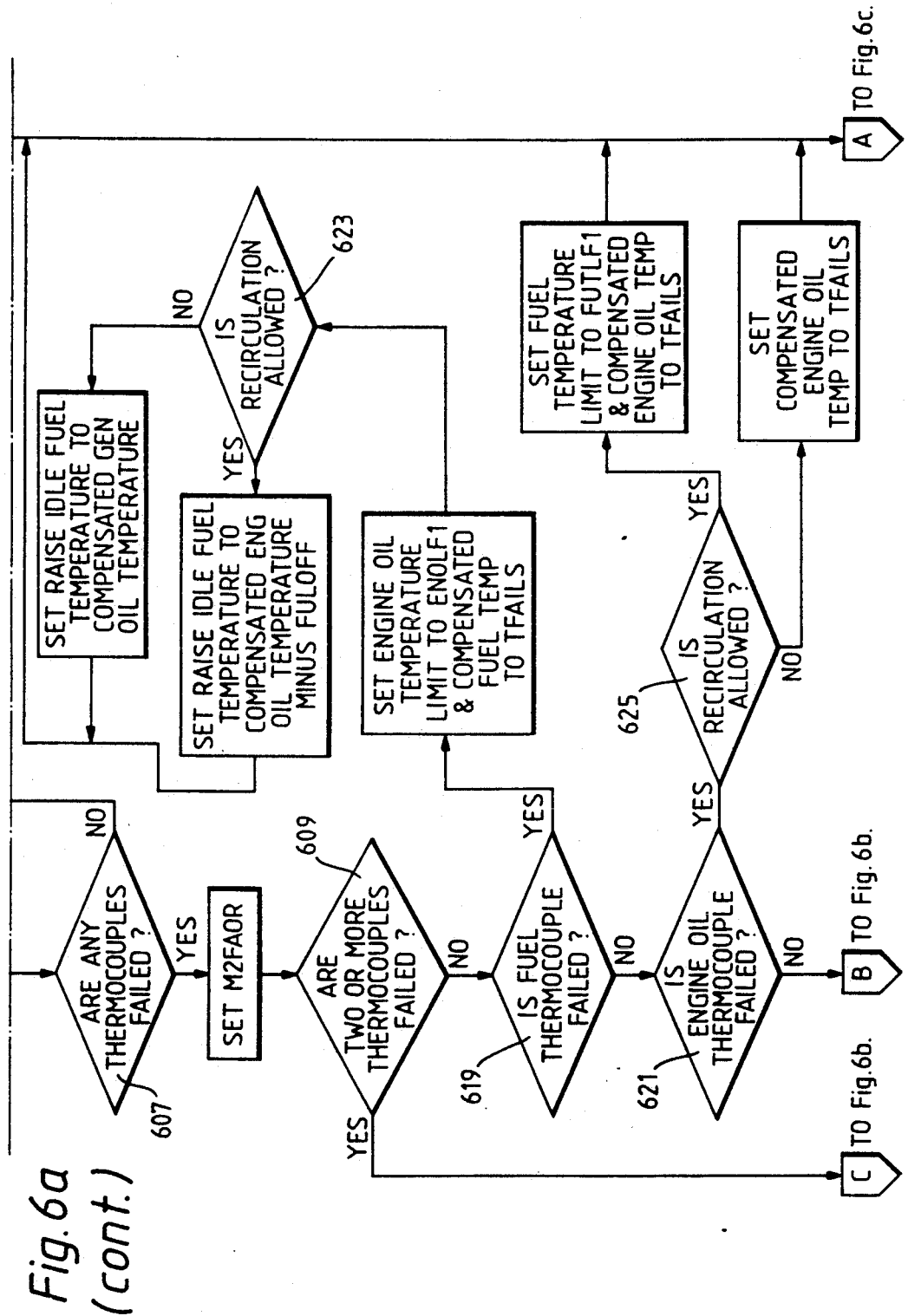

FIG. 6a is concerned with the way in which the program sets fuel and oil temperature limits to their initial values after activation of the EEC 121, and also shows the first stages of how the program copes with thermocouple failures.

At all times after it is switched on, the heat management system's control program in EEC 121 constantly checks, by means of logic decision 601, whether or not the rotational speed of the engine is greater than idling speed—in fact, whether a software implemented speed-sensitive switch in EEC 121 has been set to the logical one state. If the switch has been so set, FUTLIM, the FUel Temperature LIMit, is set to High, FUTLIMH (e.g. 120°), and this becomes the upper allowable fuel temperature in the main part of the fuel system against which the reading from thermocouple T1 is checked. If the switch has not been set, the program makes logic decision 603, by checking the value of a data word on the aircraft data bus 124. This indicates whether micro-switches in the aircraft landing gear suspension have been depressed, i.e. whether the aircraft is on the ground or not. If it is on the ground, FUTLIM is set to High, FUTLIMH, as before, but if it is not on the ground, FUTLIM is set to low, FUTLIML (e.g. 100°) and this becomes the upper allowable fuel temperature reading for thermocouple T1 instead of FUTLIMH.

With FUTLIM set either High or Low, the next logic decision 605 determines whether the current state of the aircraft renders recirculation of fuel back to the wing tank outer cell 104 via path M allowable. Such recirculation is not allowed when any one or more of the following conditions exist:

(a) A data word on the aircraft data bus 124 contains an "inhibit" bit, indicating that recirculation is not desired at the moment;

(b) the data word which could contain the "inhibit" bit is not received by EEC 121;

(c) a "flag" bit has been set in a data word on the EEC's own internal data bus, indicating from data received on the aircraft data bus, that the pilot's throttle lever angle is greater than a predetermined amount and that the forward speed of the aircraft has risen through a Mach number which indicates that a take-off is about to occur. This flag bit remains set until the aircraft reaches a certain satisfactory height.

If recirculation is allowed, GLM, the Generator oil system's temperature LiMit, is set to Low, GLML (e.g. 100° C.), and this becomes the upper allowable oil temperature in the generator oil system 300 against which the reading from thermocouple T3 is checked. If recirculation is not allowed, GLM is set to High, GLMH (e.g. 127° C.), and this becomes the upper allowable reading for thermocouple T3 instead of GLML.

With GLM set either High or Low, the program then sets the ENgine Oil system's temperature LiMit to its Normal value ENOLMN (e.g. 160° C.), and this is then the upper allowable oil temperature in the engine oil system 200 against which the reading from thermocouple T2 is checked.

Next, in logic decision 607, the program examines the digitised signals from the thermocouples T1 to T3 to see if any of them have failed, as shown by a null or very low signal level. Assuming for the time being that no thermocouples have failed, the default operational mode flag M2FAOR is cleared and an appropriate upper temperature limit is set for the fuel in the main part of the fuel system with respect to operation of the engine with a raised idle speed, which of course is achieved by EEC 121 signalling fuel metering unit 115 to allow an increased fuel flow to combustor 119. Raising of the engine idle speed is necessary in order to prevent cavitation in the h.p. fuel pump 113 due to the effect of high initial fuel temperatures at low engine speeds. The amount by which the idle speed is raised depends on the altitude at which the engine is operating, as well as fuel temperature, and therefore idle speed is raised according to a schedule which relates the three parameters, the schedule being held as data in ROM in EEC 121.

Note from FIG. 6a that the oil and fuel temperature limits mentioned above subsequent to logic 605 are compensated, i.e. the program considers the temperatures sensed by thermocouples T1 to T3 to be higher or lower than actually indicated, in order to allow for the hysteresis of the thermocouples with rising or falling temperatures. This is to make sure that each temperature limit recognised by the program is tripped at substantially the same time as the temperature of the oil or fuel in the system concerned actually passes through that limit.

When the fuel temperature limits for raised idle speeds have been set, the program has completed its temperature limit initialisation phase and progresses to the main control logic for selection of the appropriate operational mode for the system as shown in FIG. 6c starting at A, described later.

Assuming now that the program detects at least one failed thermocouple at logic decision 607, the action set M2FAOR is taken, meaning that the program sets the default operational mode (mode 2, FIG. 3) databit (flag) in EEC 121 before then deciding at 609 whether two or more of the thermocouples have failed. If they have, the logic progresses to point C in FIG. 6b, whereupon the action Set Mode 4 automatically follows, meaning that EEC 121 signals fuel diverter valve unit 140 to achieve the fourth fuel flow configuration shown in FIG. 5. If all three thermocouples T1 to T3 have in fact failed, the output from logic decision 611 is "yes" and as a consequence the EEC 121 signals the air modulating flap valve unit 410 to assume the fully open state in order to dump the maximum amount of heat from the system, since a worst case must be assumed for the oil and fuel temperatures for safety's sake. It is also necessary to set an upper limit RSIDFL for the RaiSe IDle FueL temperature (see Table 1). Continuing to point D in FIG. 6C, decision logic 613 compares RSIDFL with the value, say, 140° C. in order to determine whether it is necessary to raise the idling speed of the engine. If RSIDFL is greater than 140° C., it is necessary for the program to calculate a raised idle speed in accordance with the schedule mentioned earlier, this information then being passed to the appropriate software control loop function in FEC 121 for control of fuel flow. If RSIDFL is not greater than 140° C., then obviously no adjustment of idling speed is necessary.

Figure 6B:
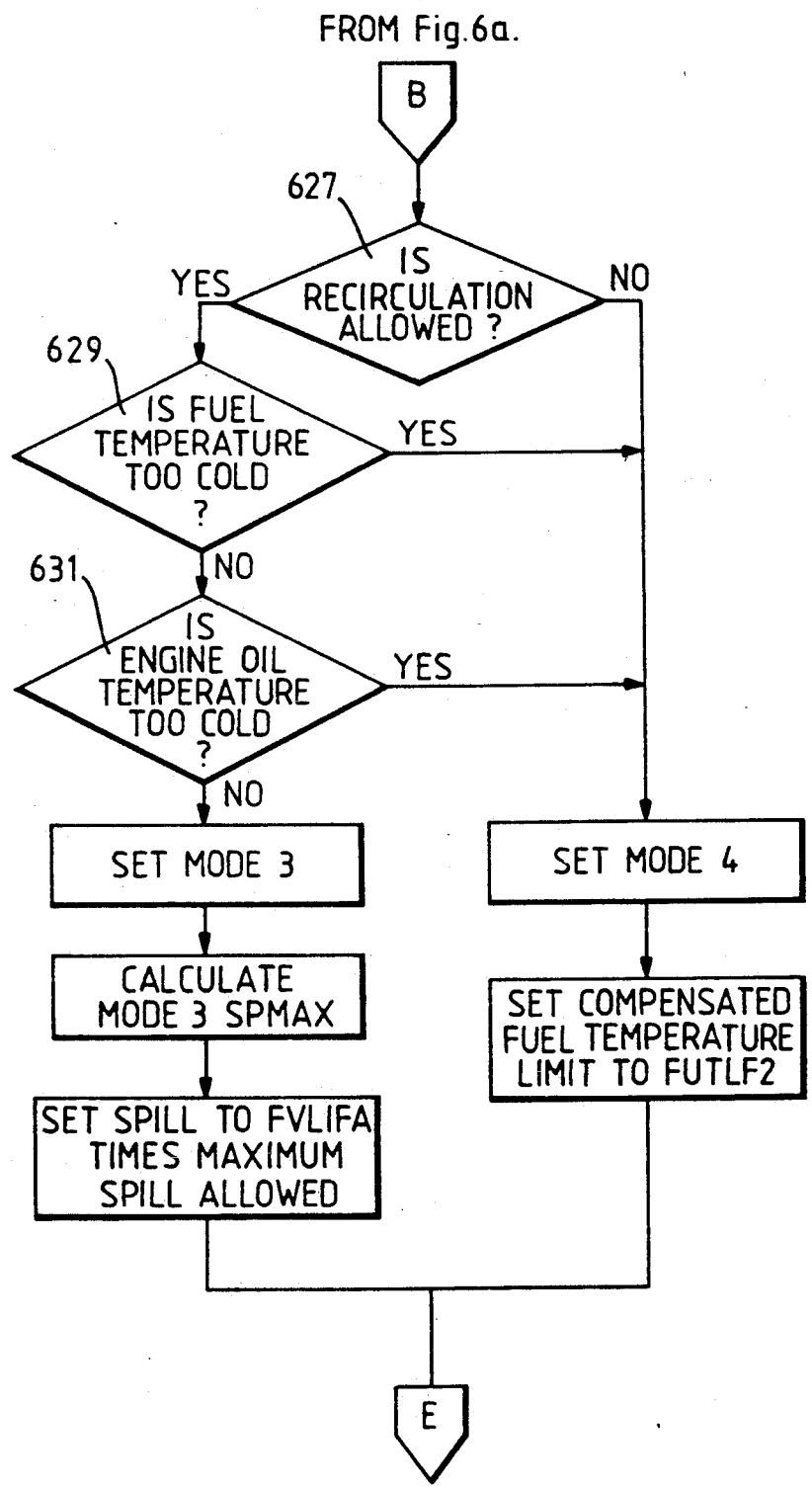

Returning to decision logic 611 in FIG. 6b, if only two of the thermocouples T1 to T3 are failed, it is necessary to decide in logics 615 and 617 which two of the three have failed in order to decide how best to control the air valve 410 for maximum fuel efficiency under the prevailing circumstances. Thus, if both T1 and T2 have failed, the data from T3, measuring the temperature in the generator oil system 300, must be utilised for control purposes. In this case, both the compensated engine oil temperature and the compensated fuel temperature must be set to a default value TFAILS (signifying FAILed Thermocouple Substitute temperature), which represents an upper limit with a large safety margin, the raise idle fuel temperature RSIDFL must be approximated by a compensated reading from thermocouple T3, and the program must cause the EEC 121 to give a control output to air valve 410 which limits the reading from T3 to an upper value GLF1 (signifying Generator oil temperature Limit for thermocouple Failure—No. 1). Note that the reading from T3 is compensated by reference to cross-calibrations of T1 and T3 for the appropriate raised idle condition.

Similarly, from decision logic 617, if T1 and T3 have failed, but not T2, then the compensated generator oil temperature and the compensated fuel temperature are set to TFAILS, RSIDFL is approximated by a compensated reading of the engine oil temperature from T2 (plus an allowance FULOFF, which is a negative OFFset between the FUel temperature and the engine oil temperature) and the program controls air value 410 to limit the reading from T2 to an upper value ENOLF2 (signifying ENgine Oil temperature Limit for thermocouple Failure—No. 2).

Lastly, from decision logic 615, if T2 and T3 have failed, but not T1, then the compensated temperatures which would have been derived from T2 and T3 are set to value TFAILS, RSIDFL is set to the compensated fuel temperature derived from T1 and the program controls air valve 410 to limit the reading from T1 to an upper value FUTLF1 (signifying FUel Temperature Limit for thermocouple Failure—No. 1).

Having decided the controlling parameters for air valve 410 if only two thermocouples have failed, the program then goes to point D on FIG. 6c and proceeds as previously explained.

Returning now to decision logic 609 on FIG. 6a, if only one thermocouple has failed, decisions 619 and 621 determine which one it is. If thermocouple T1 has failed, then the maximum temperature limit for the engine oil is set to ENOLF1 (signifying ENgine Oil temperature Limit for thermocouple Failure—No. 1) and the compensated fuel temperature is set to TFAILS. A decision 623, similar to decision 605, is then made as to whether recirculation of fuel back to the wing tank is allowable. If it is, then the raise idle fuel temperature RSIDFL is substituted for by the compensated reading from T2 (minus the allowance FULOFF, mentioned previously). If recirculation is not allowed, the compensated reading from T3 is substituted for RSIDFL. In either case, the program then rejoins the main control logic at A on FIG. 6c.

If decision logic 619 determines that T1 is OK, decision 621 then determines whether T2 has failed. If it has, decision 625, similar to decision 605, determines whether recirculation is allowed. If it is, then the maximum fuel temperature limit in the program is set to the default value FUTLF1 previously mentioned and the compensated engine oil temperature is set to the default value TFAILS. IF recirculation is now allowed, only the compensated engine oil temperature is set to the default value. In either case, the program then rejoins the main control logic at A on FIG. 6c.

Figure 5:
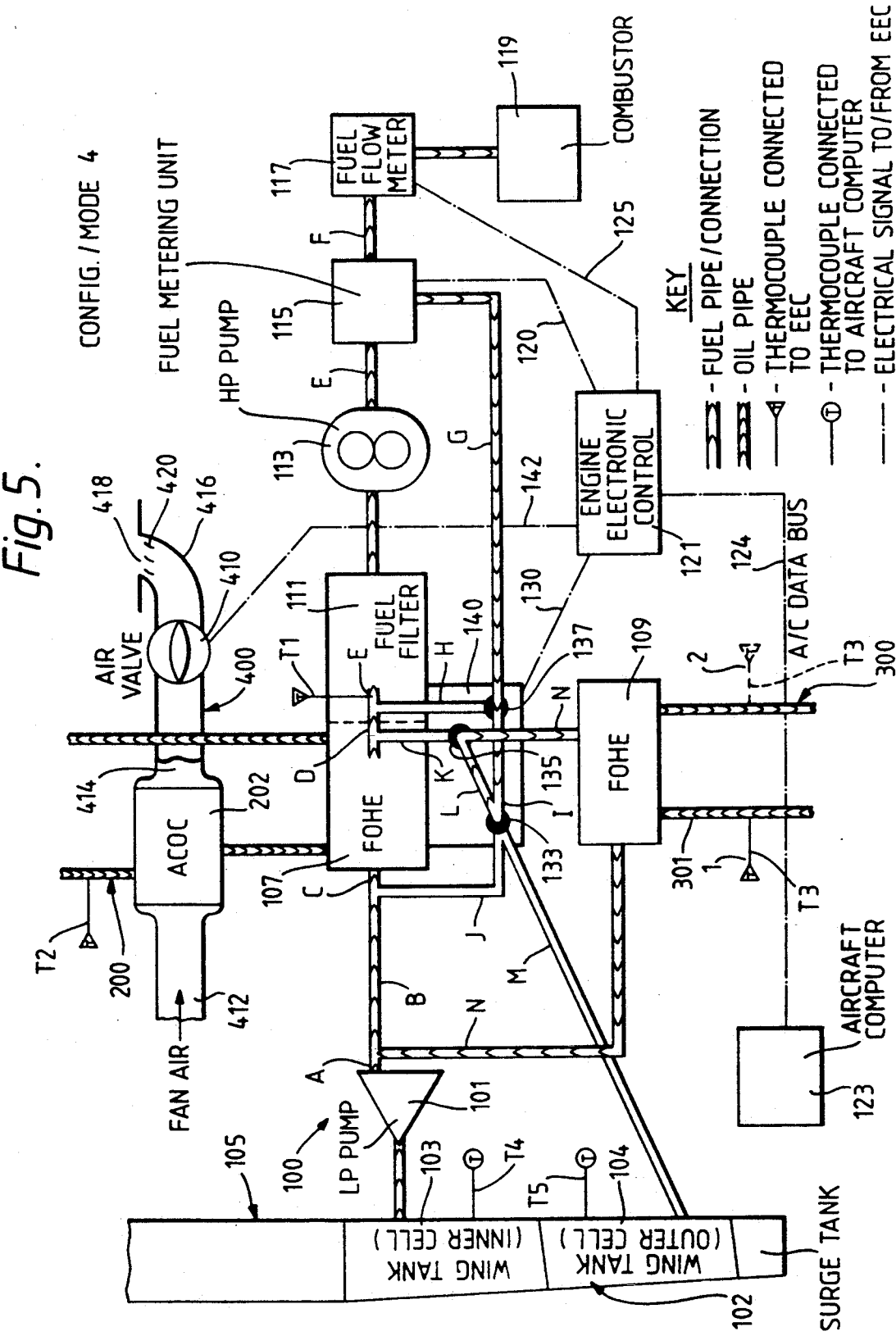

If decisions 619 and 621 have determined that neither T1 or T2 have failed, T3 must have failed and the program continues at B on FIG. 6b, where decisions 627, 629 and 631 are taken to determine whether the system will operate in mode 3 (FIG. 4) or mode 4 (FIG. 5). Again, decision 627 is similar to decision 605. If recirculation of fuel back to the wing tank 102 is not allowed, then the system is set to operate in mode 4, and a maximum limit of FUTLF2 (somewhat lower than FUTLF1) is set for the compensated reading from T1, with immediate progression to point E on FIG. 6c.

However, if recirculation is allowed, decisions 629 and 631 must determine whether fuel and oil temperatures are too low for operation in mode 3 and if either of them are too low then the logic sets the system to mode 4 anyway, with subsequent steps as in the previous paragraph.

The decision 629 as to whether the fuel is too cold depends upon a comparison of the Compensated FUEL Temperature signal TFUELC derived from T1 with a MiNimum lower FUel temperature limit FUTMN1 (say, 5° C. 5° C.) If TFUEL C is less than or equal to FUTMN1, the fuel is too cold to allow it to be recirculated back to the wing tank (since it could already be at the freezing point of water) and therefore mode 4 should be used since it does not utilise fuel recirculation to the wing tank.

If TFUELC is greater than FUTMN1 then decision 631 decides whether the engine oil temperature is too low by comparing the Compensated ENGine Oil Temperature signal TOENGC with a MiNimum lower ENgine Oil temperature limit ENOMN1 (say, 20° C.±5° C.). If TOENGC is less than or equal to ENOMN1, the engine oil is too cool to add much, if any heat to the fuel in the engine FOHE 107 and therefore mode 4 (FIG. 5) should be used since it utilises the fuel spill loop from the fuel metering unit 115 to cool the generator oil system through FOHE 109.

If both the fuel and engine oil temperatures are not too cold, then the system is set to operational mode 3 and the program must then control the amount of fuel which can be allowed to recirculate (spill) back to the wing tank 102. To do this it adjusts the value of a signal required on line 130 to control a torque motor (not shown) in valve unit 140 to open a fuel spill valve (702, FIG. 7) by an amount which will give a recirculatory flow down path M which is near to, but no greater than, a certain limit specified by the aircraft manufacturer.

The simplest way to achieve this would be by providing a fuel flow meter (not shown, but similar to meter 117) in fuel flow path M, which would give a feedback signal to the EEC 121 either directly, or through the aircraft data bus 124, for comparison with the aircraft manufacturer's limit. However, in the absence of such a fuel flow meter and feedback signal, a value SPMAX, representing the MAXimum fuel SPill valve flow area setting which will avoid exceeding the aircraft manufacturer's limit, is calculated. SPMAX varies with engine speed because the low pressure fuel pump 101 is mechanically driven from the engine, thereby causing the pump pressure rise and fuel line pressure losses to vary also. Hence SPMAX is derived from schedules held in ROM in EEC 121.

To provide a factor of safety, SPMAX is multiplied by a Fuel Valve LImit FActor, FVLIFA, of, say, 0.7, and after appropriate calibration the result is then used to provide a command signal to the fuel spill valve torque motor in valve unit 140.

Going now to point E on FIG. 6c, it will be seen that the next action 632 is to control the air valve 410 so that just sufficient heat is dumped to correct either the error difference between the compensated fuel temperature TFUELC and the corresponding FUel Temperature upper LIMit, FUTLIM, or the error between the compensated engine oil temperature TOENGC and the corresponding ENgine Oil temperature upper LIMit, ENCIIM, whichever error is the greatest (decided by "highest wins" logic). Thereafter, the program goes to decision 613, described earlier.

Having described the program logic operative for thermocouple failures, it remains to follow the main logic through from point A on FIG. 6c.

First of all, decisions 633,635 and 637 are made, which are the same as decisions 629,631 and 605 respectively, already described. If either fuel or engine oil temperatures are too cold, operational mode 4 (FIG. 5) is selected, but with the air valve 410 closed to a avoid loosing heat unnecessarily. If neither of these two fluid temperatures is too cold, and recirculation of fuel back to the wing tank is allowed, decision 639 is taken as to whether the Compensated Temperature TOGC of thermocouple T3 for the Oil in the Generator oil system 300 is greater than the corresponding Generator oil upper temperature LIMit,GLIM. If it is, decision 641 checks whether a data bit (flag) has been set in EEC 121, indicating whether or not the system is latched for operation in mode 3. This is by nature of a check on correct operation of decision logic 637, since the flag is only set when recirculation of fuel to wing tank 102 is allowed. If the mode 3 select flag has been set, then the program sets the system to operational mode 3, calculates SPMAX as described above, and then below that limit adjusts the fuel spill valve in unit 140 to spill an amount of fuel down path M which will be just sufficient to eliminate the error difference between the compensated generator oil temperature, TOGC, from T3, and the generator oil upper temperature limit, GLIM, as indicated at action 642. Thereafter the program controls the air valve 410 in accordance with action 632 and the subsequent logic as already described.

Returning to decision 639, if TOGC is not greater than GLIM, the mode 3 select flag, already set at decision 637, is reset to nil, and the system is set to operational mode 1 (FIG. 2). A nil result at decision 641 also sets the system to mode 1 as shown.

Thereafter, SPMAX is calculated for mode 1, using different schedules than used in connection with mode 3 to allow for the different flow configuration, and the fuel spill valve is adjusted below the SPMAX limit so that the amount of fuel flowing down path M is just sufficient to eliminate the maximum error EMOFE of the two error differences TOGC—GLIM and TFUELC—FUTLIM, the latter two values having been mentioned above in connection with action 632. Next, at decision 643, the program checks the position of the fuel spill valve in unit 140, which is signalled back to EEC 121 in order to complete the control loop. If it is not wide open, EMOFE can remain in control of the spill valve and the program jumps again to action 632. If it is wide open then there is a possibility that the flow of fuel back to the wing tank would be more economically controlled with the system in operational mode 3, so that the spill valve would be controlled to minimise TOGC—GLIM, the generator oil temperature error, as at action 642. This possibility is checked by decision logic 645, in which TOGC—GLIM is compared with a value EMAX, which is the output of a "highest wins" logic which selects the greatest of TOGC—GLIM, TFUELC—FUTLIM, and TOENGC—ENOLIM, i.e. the greatest one of the generator oil temperature error, the fuel temperature error and the engine oil temperature error. If EMAX is in fact greater than the generator oil temperature error, then mode 1 is retained as the most efficient and the program moves to action 632 again. If EMAX is not greater, then the mode 3 select flag is set again and the logic subsequent to decision 641 is entered.

Figure 3:
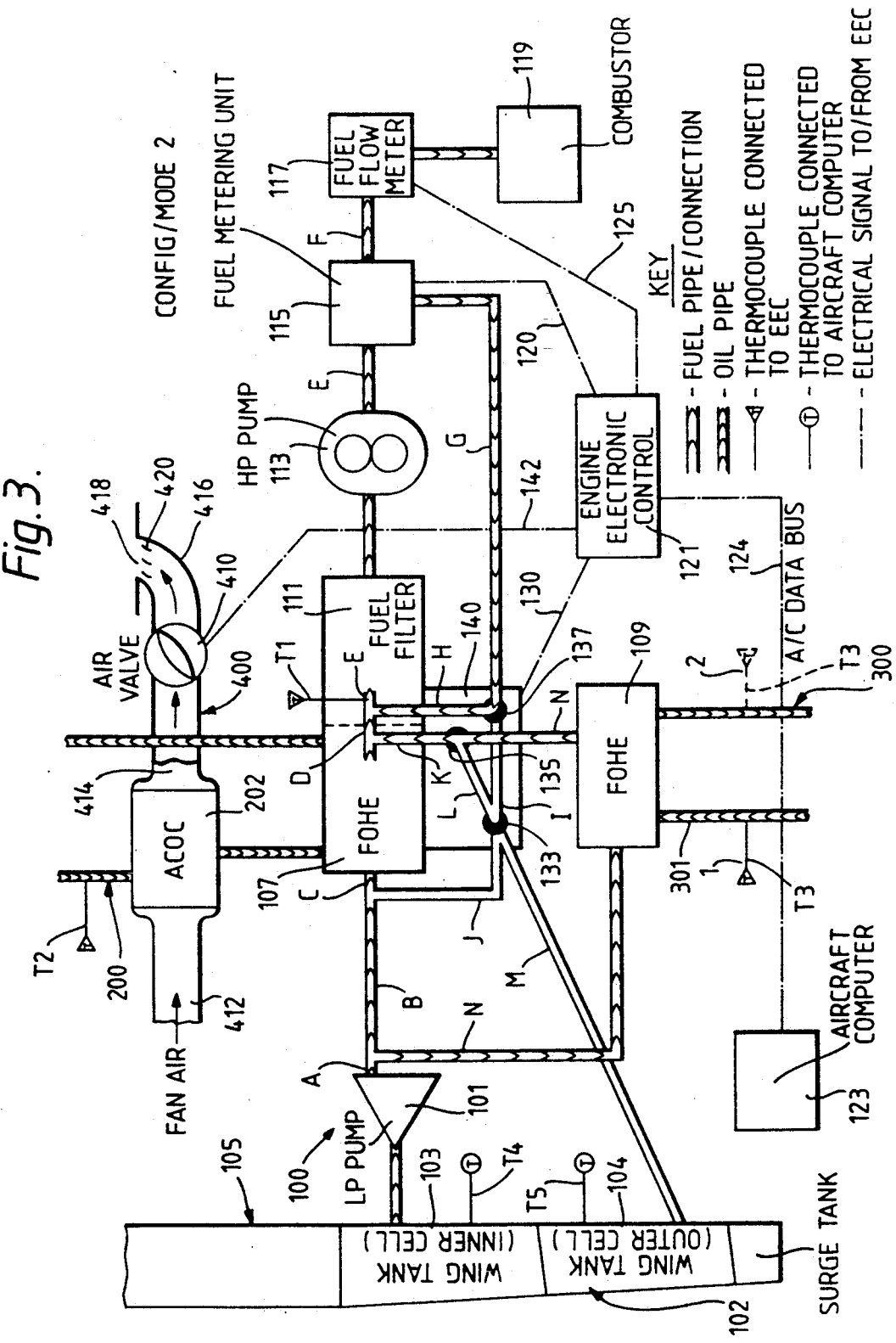
FIGS. 3,4 and 5 shows the same heat management system in second, third and fourth fuel flow configurations respectively and operating in corresponding operational modes.

Returning now to decision 637, if recirculation is not allowed, an initial decision 647 is made as to whether it is permissible to operate the system in mode 2 (FIG. 3). This depends upon a comparison of the fuel burn rate as measured by flow meter 117 and a certain threshold value of fuel flow. If the fuel burn rate is less than the threshold, operation in mode 2 is not allowed due to the possibility that excessive repumping of fuel around loop EGHE by high pressure pump 113 could cause overheating of the fuel. Hence, the system is set to mode 4 at action 648 if the output from decision 647 is "no", and the air valve 410 is adjusted at action 650 so as to eliminate EMAX, in order to cater for all eventualities in respect of fluid circuit upper temperature limits. The logic then progresses to decision 613, previously described.

If, on the other hand, decision 647 is that mode 2 operation is permissible, decision 649 compares EMAX (which may be positive or negative) with a value M4SELR, which is a threshold value below which a Mode 4 SELect latch is Reset. Here, M4SELR=0, so that if EMAX is negative (meaning that all the fluid circuit temperature errors are negative), the mode 4 select flag, set when recirculation of fuel back to the wing tank was not allowed in earlier logic, is reset to allow selection of mode 2, see action 652. However, for mode 2 to be retained, decision 651, which is identical to decision 639, must be negative. If the generator oil temperature is not over the limit, GLIM, and the feedback from the air valve shows it is not wide open (decision 653), then mode 2 is retained and the program proceeds to action 650, described above. However, if decision 649 says that EMAX is at least as great as 0, then the system is set to mode 4 at action 648 provided the mode 4 select flag has been set previously as determined at decision 655; if the flag has not been set, then the program goes to set mode 2 at action 652, discussed earlier. Mode 2 is also overridden in favour of mode 4 by action 648 if the generator oil temperature is over the limit, GLIM, or by action 652 if decision 653 determines that the air valve is wide open; in either case action 650 occurs in mode 4.

SUMMARY OF CONTROL LOGIC

The main provisions of the above logic are:
(a) establish permissibility of fuel recirculation (spill) to the wing tank;
(b) establish permissibility of operation in mode 2;
(c) establish conditions requiring selection of mode 4;
(d) establish conditions requiring selection of mode 3;
(e) operate in mode 1 at all times when recirculation to the wing tank is permitted and mode 3 selection (d) not established.
(f) operate in mode 2 at all times when recirculation to the wing tank is not permitted and it has been established that operation in mode 2 is OK and no thermocouple failures have occurred which prejudice correct operation of the system.
(g) use the air modulation valve 410 and the fuel diverter and spill valve unit 140 to control, in closed loop through the EEC 121, the fuel, engine oil and generator oil circuit temperatures.

It will be seen that FIG. 6c shows the logic for normal operation of the system and is used when either no thermocouple failures have been detected or when appropriate substitution has been made for any one failed thermocouple signal.

There are two alternatives for normal operation if recirculation of fuel to the wing tanks is not permitted; if the fuel temperature TFUELC or the engine oil temperature TOENGC are below their minimum set limits, the logic selects mode 4 and sets the fuel spill valve in valve unit 140 and the air valve 410 to their fully closed positions; however, if TFUELC or TOENGC are above their minimum limits, a choice is made between modes 2 and 4.

Mode 2 operation is overridden by selection of mode 4 if any one of the following conditions established:
(i) Mode 2 not OK (logic 647)
(ii) Generator oil temperature is above a maximum limit
iii) Air valve 410 is wide open and the generator oil temperature is not above the maximum limit
(iv) Mode 4 select flag is set.

When operating in modes 2 and 4 as above control is against errors generated by comparison of engine oil and fuel temperatures with their relative datums, and by modulation of the air valve 410 to make EMAX 0.

If recirculation of fuel to the wing tank is permitted, and fuel temperature TFUELC or engine oil temperature TOENGC are above their minimum set limits, mode 1 is selected as the primary control mode, whereupon control is against errors generated by comparison of engine oil and fuel temperatures with their relative datums, and modulation of the fuel spill valve in valve unit 140 will be to make EMAX 0.

Such mode 1 operation is overridden by the selection of mode 3 if one of the following conditions is established:
(i) Fuel spill valve in valve unit 140 is wide open EMAX = temperature error (TOGC-GLIM) in the generator oil;
(ii) Mode 3 select flag is set.

Modulation of the air valve 410 in both modes 1 and will be to make the maximum error of fuel temperature or engine oil temperature tend towards zero.

FIGS. 6a and 6b (apart from the initialisation routine in FIG. 6a) illustrate back up control logic required to allow continued operation of the system when failures are detected in system elements essential to normal control.

CONTROL PHILOSOPHY

The usage of airflow through ACOC 202 is kept to the absolute minimum consistent with maintaining fuel and oil temperatures within their set limits. To achieve this, fuel recirculation to the wing tank is maximally utilised wherever possible before air valve 410 is opened, consistent with maintaining overall control.

In modes 1 and 3 both the air valve 410 and the fuel spill valve in valve unit 140 can be modulated simultaneously to enable dumping of heat from both the fuel and oil circuits, which can overload independently of each other whilst in these modes. However, in modes 2 and 4, the only cooling control facility is the air valve 410.

Drive of each control loop between the EEC 121 and the valves is in response to temperature error signals and "highest wins" gate selection of the temperature errors in the fuel, engine oil and generator oil flowpaths.

The following table summarises the control capability required in each of the four modes.

| IN MODE | TFUELC over limit | TOENGC over limit | TOGC over limit |
| --- | --- | --- | --- |
| 1 | Modulate fuel spill to eliminate $E_{MAX}$. Modulate air to eliminate max. temp. error in fuel and engine oil circuits. | Modulate fuel spill to eliminate $E_{MAX}$. Modulate air to ACOC to eliminate max. temp. error in fuel and engine oil circuits. | Modulate fuel spill to eliminate $E_{MAX}$. (Change to Mode 3 and latch in Mode 3 if spill wide open and $E_{MAX}$ = temp. error in generator oil circuit). |
| 2 | Modulate Air to eliminate EMAX | Modulate Air to eliminate EMAX | Change to Mode 4 |
| 3 | Modulate Air | Modulate Air | Modulate Spill |
| 4 | Modulate Air | Modulate Air | Modulate Air |

DESCRIPTION OF OPERATIONAL MODES/CONFIGURATIONS

Referring now specifically to the flow configurations illustrated in FIGS. 2 to 5, FIG. 2 shows the system configured for operation in mode 1, which is a normal operational mode. This mode maximizes use of the engine and aircraft fuel system as a heat sink, and should eliminate the requirement for air cooling of the engine oil system in ACOC 202.

Cooling of the generator oil system 300 and some cooling of the engine oil system 200 is achieved by setting the fuel control valves in unit 140 to allow normal fuel recirculation through the high pressure fuel pump 113 around path EGHE and recirculation of a controlled amount of low pressure fuel back to the aircraft wing tank 102 through paths LM after it has passed through FOHE 109 and FOHE 107. The tank 102 then absorbs and dissipates the heat of the recirculated fuel to maintain a temperature below a certain maximum value (say, 54° C.) at entry to the low pressure pump 101. Since only a proportion of fuel recirculated to the tank 102 has passed through FOHE 107, the remainder of the heat from the engine oil must be dissipated by the flow to the engine's combustor 119.

FIG. 3 shows operation in mode 2, which is the second normal mode. Here, the fuel being burned in the combustor 119 may provide a sufficient heat sink to cool both the generator oil system 300 and the engine oil system 200, the fuel control valves in unit 140 being set to allow normal fuel recirculation through pump 113 as for mode 1 but to allow all the flow through FOHE 109 to pass into the main flow to the engine. However, if there is insufficient heat loss from the oil systems to the fuel being passed to the combustor 119, the air valve 410 can be opened slightly to allow heat to be dumped from the engine oil system 200 to the fan air through ACOC 202.

FIG. 4 shows operation in mode 3, which is adopted in the event that the temperature of the fuel at the inlet of high pressure pump 113 is too high (this happens at very low engine speeds due to low flow to combustor 119 and recirculation of fuel from the fuel metering unit 115). In this flow configuration the fuel control valves in unit 140 are set to cause the fuel recirculated along path G to return to the main flow before FOHE 107 and to allow fuel which has been heated in FOHE 109 to flow back to the wing tank 102 along paths NLM. The air valve 410 is set fully open for maximum dumping of heat from the engine oil system to the fan air. Hence, heat flows from the fuel to the engine oil in FOHE 107 and from the engine oil to the fan air in ACOC 202 in order to keep both the fuel and the engine oil within the specified temperature limits. The generator oil is kept from overheating by recirculating all the fuel passing through FOHE 109 to the wing tank, through of course this flow is minimised as far as possible.

FIG. 5 shows operation in mode 4, which is adopted when mode 3 is no longer an acceptable state, due primarily to the generator oil system 300 tending to overtemperature, or the recirculation to wing tank being unacceptable, the latter being due either to the flow into the tank exceeding 100° C. or a shut-off signal appearing on the aircraft data bus. In this state the fuel control valves in unit 140 are set to cause the fuel recirculated along path G to be passed through FOHE 109 and hence to the outlet of the low pressure fuel pump 101. Hence, the heat generated by pumping the fuel, and in the generator oil system, is passed into the FOHE 107. The air valve 410 being still open, the heat dumped through ACOC 202 to the fan air is the combined heat generated by the fuel system, the generator oil system, and the engine oil system.

It may be noted here that whereas the above description is directed to a heat management system having four basic modes of operation, clearly the number of modes is at the discretion of the designer in respect of the detailed design of the hardware and software components of the system.

Although in the above description we have only specified a direct heat exchange relationship between the fuel system 100 and the two oil systems 200, 300, plus indirect heat exchange with fan bleed air and the aircraft wing, it will be evident to the specialist that further heat exchange between the fuel system and other closed- or open-cicuit fluid-flow systems, if present, could be arranged if this were possible and desireable. Furthermore, there would be the possibility of including more than one back-to-tank fuel flow path, e.g. as a back-up to the main one, or to a separate tank; and although two of the fuel flow configurations described above include a back-to-tank flow path, it may be desireable in some circumstances to have more than two configurations, or only one, involving such flow.

VALVE CONTROL OF FUEL DIVERSION AND RECIRCULATION TO WING TANKS

As mentioned previously, valve unit 140, shown only schematically in FIGS. 2 to 5, actually comprises the combination of a fuel diverter valve 701 and a fuel spill control valve 702 as shown diagrammatically in FIGS. 7a to 7d, representing respectively the positions adopted for realizing system operating modes 1 to 4.

The diverter valve 701 is a sleeve valve comprising a valve body 703 provided with six ports 705-710. Ports 705,706 and 710 inter-communicate selectively as shown diagrammatically in area B. Ports 708 and 709 always communicate with each other but both communicate selectively with port 707 in area A. Areas A and B are bounded by dashed lines and represent a pair of cavities within the valve body 703, with which the ports communicate. Each cavity is provided with an apertured internal sleeve (not shown), which is linearly translatable to cover or uncover the ports in the walls of the cavity so as to provide the desired intercommunication between the ports. The sleeves are spring-biased and connected to a solenoid (not shown) through a fuel driven servo (not shown) so that they assume a first position when the solenoid is energized against the spring and a second position under the action of the spring when the solenoid is not energized. The results of the first and second positions in terms of permitted fuel flows through the diverter valve are indicated by arrows, diagonal lines being drawn across spaces A and B to indicate prohibited communication between ports. The first position of the sleeve valves is assumed for operational modes 1 and 2 (FIGS. 7a and 7b) and the second position for modes 3 and 4 (FIGS. 7c and d).

As indicated, ports 705 to 708 are connected to fuel system flow paths G,H,K and N marked in FIGS. 2 to 5. Ports 709,710 simply carry fuel to or from the diverter valve 701 to other ports 711,712 in the spill control valve, and may be considered to perform a similar function to imaginary flow paths I and L within the valve unit 140 shown in FIGS. 2 to 5, though they are not otherwise equivalent.

The fuel spill control valve 702 is an in-line spool valve provided with four ports 711-714 in a body 715. Ports 714 and 713 are connected to fuel system flow paths J and M respectively as indicated.

The spool 716 is axially translatable in the directions shown by the double-headed arrow by means of a torque-motor-driven screw-jack arrangement 717. Enlarged diameter lands 718,719 are provided on the spool 716 and these mate with corresponding internal lands 720,721 and 722 of the bore in which the spool 716 slides. Selective positioning of the spool in relation to the lands thereby provides the changes in interconnection of the ports 711-714 (necessary to change fuel flow configurations between operating modes 1 to 4 in conjunction with the diverter valve 701) and also modulation of the amount of fuel spilled into flow path M for recirculation to the wing tank. If "closed" for valve 702 is defined as that "hard-over" position of spool 716 shown in FIGS. 7b and 7d (Modes 2 and 4) at which no spill into path M occurs, and "open" is defined as that position range of the spool where land 718 on the spook is engaged with land 721 in the bore, thereby allowing communication between ports 712 and 714 at one end of the valve, and between ports 711 and 713 at the other end, then the following Table II can be drawn up to show how the positions of the diverter valve 701 and the fuel spill control valve 702 are selected to provide the four fuel flow configurations of the system, corresponding to operating modes 1 to 4.

TABLE II

| Mode | Diverter Valve Position | Fuel Spill Control Valve Position |
|---|---|---|
| 1 | energized | open |
| 2 | energized | closed |
| 3 | deenergized | open |
| 4 | deenergized | closed |

Although the diverter valve 701 has been described above as a dual sleeve valve, it should be understood that another form of valve, such as an in-line spool valve, could be utilized instead. Likewise, the fuel spill control valve 702 could be replaced by an alternative type, e.g. by a sleeve valve. These general types of valve are well known in the art, though it is believed that their specific arrangement and interconnection here are novel.

For closed loop control of these two valves by the program in EEC 121, positional feedback from the valves to EEC 121 is necessary. This can be readily provided by a microswitch in the case of the two-position diverter valve 701 and by a linear variable differential transformer (LVDT) in the case of the fuel spill control valve 702.

I claim:
1. A heat management system for managing the heat generated in an aircraft's gas turbine engine installation in accordance with a predetermined criteria, the heat management system comprising:
   (a) a fuel tank means in the aircraft;
   (b) a fuel system for supplying fuel to the engine, the fuel system including a fuel metering means for metering the amount of fuel supplied to the engine, and a pump means for pumping fuel from the fuel tank means through the fuel metering means to the engine;
   (c) an oil system means for supplying oil to lubricate components of the installation and remove heat therefrom;
   (d) a fuel/oil heat exchange means for exchanging heat between the fuel system and the oil system means;
   (e) an air duct means for a forced airstream;
   (f) an oil/air heat exchange means for exchanging heat between the oil system means and the air duct means;
   (g) means for selecting for reception of heat among one of the following receivers: the fuel tank means, the air duct means, the combination of the fuel tank means and the air duct means and means for transporting heat in accordance with said predetermined criteria from at least one of the fuel system means and the oil system means to a selected one of the receivers.

2. A heat management system as claimed in claim 1, in which the oil system means comprises:
   (a) an engine oil system for supplying oil to lubricate the engine and to remove heat therefrom; and
   (b) a generator oil system for supplying oil to lubricate an electrical generator and to remove heat therefrom, the electrical generator being driven by the engine;
   wherein both oil systems are thermally interfaced with the fuel system means through respective fuel/oil heat exchange means.

3. A heat management system as claimed in claim 1, in which the means for selectively transporting heat from the fuel system and the oil system means includes means for selecting at least one of the following: transfer of heat from the fuel system to the air duct means through the oil system means, and transfer of heat from the oil system means to the fuel tank means through the fuel system.

4. A heat management system for managing the heat generated in an aircraft's gas turbine engine installation in accordance with a predetermined criteria, the heat management system comprising:
   (a) a fuel tank means in the aircraft;
   (b) a fuel system for supplying fuel to the engine, the fuel system including a fuel metering means for metering the amount of fuel supplied to the engine, and a pump means for pumping fuel from the fuel tank means through the fuel metering means to the engine;
   (c) an oil system means for supplying oil to lubricate components of the installation and remove heat therefrom;
   (d) a fuel/oil heat exchange means for exchanging heat between the fuel system and the oil system means;
   (e) an air duct means for a forced airstream;
   (f) an oil/air heat exchange means for exchanging heat between the oil system means and the air duct means;
   (g) means for selectively transporting heat in accordance with said predetermined criteria from at least one of the fuel system means and the oil system means to a selected one of the following: fuel tank means, the air duct means, or both the fuel tank means and the air duct means and in which the means for selectively transporting heat from the fuel system and the oil system means comprises:
      (a) a valve means associated with the oil/air heat exchange means for selectively allowing said transfer of heat from the oil system means to the air duct means;
      (b) a plurality of fuel flow paths in the fuel system for connecting the pump means, the fuel metering means, the fuel/oil heat exchange means and the fuel tank means in a plurality of different fuel-flow configurations with respect to the flow of fuel around the fuel system, the fuel flow paths including a return fuel flow path from the fuel/oil heat exchange means to the fuel tank means;
      (c) a fuel valve means for varying the route of the fuel through said fuel flow paths to achieve said different fuel flow configurations and selectively allowing recirculation of fuel back to the fuel tank means through said return fuel flow path;
      (d) a temperature sensor means for sensing the temperature of fuel in the fuel system and oil in the oil system means; and
      (e) a control means operatively linked to said temperature sensor means and both said valve means thereby to control said transport of heat in accordance with said predetermined criteria.

5. A heat management system for managing the heat generated in an aircraft's gas turbine engine installation in accordance with a predetermined criteria, the heat management system comprising:
 (a) a fuel tank means in the aircraft;
 (b) a fuel system for supplying fuel to the engine, the fuel system including a fuel metering means for metering the amount of fuel supplied to the engine, and a pump means for pumping fuel from the fuel tank means through the fuel metering means to the engine;
 (c) an engine oil system for supplying oil to lubricate components of the engine and remove heat therefrom;
 (d) an electrical generator oil system for supplying oil to lubricate said generator and remove heat therefrom;
 (e) a first fuel/oil heat exchange means for exchanging heat between the fuel system and the engine oil system;
 (f) a second fuel/oil heat exchange means for exchanging heat between the fuel system and the electrical generator oil system;
 (g) an air duct means for a forced airstream; and
 (h) an oil/air heat exchange means for exchanging heat between the engine oil system and the air duct means,
 wherein the heat management system includes means selectively operable at both upper and lower engine speed conditions to transport heat in accordance with said predetermined criteria between the electrical generator oil system and the air duct means via the first fuel/oil heat exchange means and the oil/air heat exchange means.

6. A heat management system according to claim 5, further characterized by means for selectively transporting heat in accordance with said predetermined criteria from at least one of the oil systems to a selected one of the fuel tank means, the air duct means, and both the fuel tank means and the air duct means.

7. A heat management system for managing the heat generated in an aircraft's gas turbine engine installation in accordance with a predetermined criteria, the heat management system comprising:
 (a) a fuel tank means in the aircraft;
 (b) a fuel system for supplying fuel to the engine, the fuel system including a fuel metering means for metering the amount of fuel supplied to the engine, and a pump means for pumping fuel from the fuel tank means through the fuel metering means to the engine;
 (c) an engine oil system for supplying oil to lubricate component of the engine and remove heat therefrom;
 (d) an electrical generator oil system for supplying oil to lubricate said generator and remove heat therefrom;
 (e) a first fuel/oil heat exchange means for exchanging heat between the fuel system and the engine oil system;
 (f) a second fuel/oil heat exchange means for exchanging heat between the fuel system and the electrical generator oil system;
 (g) an air duct means for a force airstream; and
 (h) an oil/air heat exchange means for exchanging heat between the engine oil system and the air duct means;
 wherein the heat management system is characterized by means for selectively transporting heat in accordance with said predetermined criteria between the electrical generator oil system and the air duct means via the first fuel/oil heat exchange means and the oil/air heat exchange means and in which the means for selectively transporting heat in accordance with said predetermined criteria comprises:
 (a) a valve means associated with the oil/air heat exchange means for selectively allowing said transfer of heat from the engine oil system to the air duct means;
 (b) a plurality of fuel flow paths in the fuel system for connecting the pump means, the fuel metering means, and both fuel/oil heat exchange means in a plurality of different fuel-flow configurations with respect to the flow of fuel around the fuel system;
 (c) a fuel valve means for varying the route of the fuel through said fuel flow configurations;
 (d) a temperature sensor means for sensing the temperature of fuel in the fuel system and oil in both the engine oil system and the electrical generator oil system; and
 (e) a control means operatively linked to said temperature sensor means and both said valve means thereby to control said transport of heat in accordance with said predetermined criteria.

8. A heat management system for managing the heat generated in an aircraft's gas turbine engine installation in accordance with a predetermined criteria, the heat management system comprising:
 (a) a fuel tank means in the aircraft;
 (b) a fuel system for supplying fuel to the engine, the fuel system including a fuel metering means for metering the amount of fuel supplied to the engine, and a pump means for pumping fuel from the fuel tank means through the fuel metering means to the engine;
 (c) an engine oil system for supplying oil to lubricate components of the engine and remove heat therefrom;
 (d) an electrical generator oil system for supplying oil to lubricate said generator and remove heat therefrom;
 (e) a first fuel/oil heat exchange means for exchanging heat between the fuel system and the engine oil system;
 (f) a second fuel/oil heat exchange means for exchanging heat between the fuel system and the electrical generator oil system;
 (g) an air duct means for a forced airstream; and
 (h) an oil/air heat exchange means for exchanging heat between the engine oil system and the air duct means,
 wherein the heat management system is characterized by means for selectively transporting heat in accordance with said predetermined criteria between the electrical generator oil system and the air duct means via the first fuel/oil heat exchange means and the oil/air heat exchange means;
 said heat management system further including means for selectively transporting heat in accordance with said predetermined criteria from at least one of the oil systems to a selected one of the fuel tank means, the air duct means, and both the fuel tank means and the air duct means; and in which the means for selectively transporting heat in accordance with said predetermined criteria comprises:

(a) a valve means associated with the oil/air heat exchange means for selectively allowing said transfer of heat from the engine oil system to the air duct means;

(b) a plurality of fuel flow paths in the fuel system for connecting the pump means, the fuel metering means, the fuel/oil heat exchange means and the fuel tank means in a plurality of different fuel-flow configurations with respect to the flow of fuel around the fuel system, the fuel flow paths including a return fuel flow path from the fuel/oil heat exchange means to the fuel tank means;

(c) a fuel valve means for varying the route of the fuel through said fuel flow paths to achieve said different fuel flow configurations and selectively allowing recirculation of fuel back to the fuel tank means through said return fuel flow path;

(d) a temperature sensor means for sensing the temperature of fuel in the fuel system and oil in both the engine oil system and the electrical generator oil system; and (e) a control means operatively linked to said temperature sensor means and both said valve means thereby to control said transport of heat in accordance with said predetermined criteria.

* * * * *